(12) United States Patent
Chendamarai Kannan et al.

(10) Patent No.: US 10,785,667 B2
(45) Date of Patent: Sep. 22, 2020

(54) REFERENCE SIGNAL MEASUREMENT AND REPORTING FOR NEW RADIO (NR) SYSTEMS

(71) Applicant: QUALCOMM Incorporated, San Diego, CA (US)

(72) Inventors: Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/910,765

(22) Filed: Mar. 2, 2018

(65) Prior Publication Data

US 2018/0255472 A1 Sep. 6, 2018

Related U.S. Application Data

(60) Provisional application No. 62/467,795, filed on Mar. 6, 2017.

(51) Int. Cl.
*H04W 24/08* (2009.01)
*H04W 24/10* (2009.01)
(Continued)

(52) U.S. Cl.
CPC .......... *H04W 24/08* (2013.01); *H04B 7/0486* (2013.01); *H04W 24/10* (2013.01);
(Continued)

(58) Field of Classification Search
CPC ..... H04W 24/08; H04W 76/10; H04W 24/10; H04W 72/0453; H04W 72/1289; H04W 72/046; H04B 7/0486
See application file for complete search history.

(56) References Cited

U.S. PATENT DOCUMENTS

2013/0303168 A1 11/2013 Aminzadeh et al.
2014/0106740 A1 4/2014 Zhou et al.
(Continued)

OTHER PUBLICATIONS

Samsung, Discussion on terminology of beamforming based high frequency NR, 3GPP TSG-RAN WG2 Meeting #94, Nanjing, China, May 23-27, 2016, R2-163716 (Year: 2016).*
(Continued)

*Primary Examiner* — Ian N Moore
*Assistant Examiner* — Brian T Le
(74) *Attorney, Agent, or Firm* — Holland & Hart, LLP

(57) ABSTRACT

Methods, systems, and devices for wireless communication are described for reference signal measurement and reporting for new radio systems. A user equipment (UE) and a base station may coordinate for identifying a particular beam and subarray pair for communication. A user equipment (UE) may receive a measurement gap configuration from a base station specifying a measurement gap type of a plurality of different measurement gap types, and measure, in a measurement gap corresponding to the specified measurement gap type, a reference signal to generate a measurement using a first subarray of a plurality of subarrays of an antenna array of the UE. The UE may generate a measurement report that indicates the measurement. The UE may transmit the measurement report to the base station. The base station may use the measurement report for selecting a beam and subarray pair for communication.

28 Claims, 21 Drawing Sheets

(51) Int. Cl.
   H04B 7/0456    (2017.01)
   H04W 76/10    (2018.01)
   H04W 72/04    (2009.01)
   H04W 72/12    (2009.01)
(52) U.S. Cl.
   CPC ... *H04W 72/0453* (2013.01); *H04W 72/1289* (2013.01); *H04W 76/10* (2018.02); *H04W 72/046* (2013.01)

(56) References Cited

U.S. PATENT DOCUMENTS

| | | | | |
|---|---|---|---|---|
| 2015/0327103 | A1* | 11/2015 | Tang | H04W 24/10 370/252 |
| 2016/0050003 | A1* | 2/2016 | Ko | H04B 7/0469 370/329 |
| 2016/0192339 | A1 | 6/2016 | Axmon et al. | |
| 2016/0302098 | A1 | 10/2016 | Gheorghiu et al. | |
| 2016/0337916 | A1* | 11/2016 | Deenoo | H04W 8/22 |
| 2018/0270757 | A1* | 9/2018 | Ahn | H04L 5/00 |
| 2018/0359790 | A1* | 12/2018 | Ingale | H04W 8/24 |
| 2019/0104549 | A1* | 4/2019 | Deng | H04B 7/0617 |

OTHER PUBLICATIONS

International Search Report and Written Opinion—PCT/US2018/020926—ISA/EPO—dated May 17, 2018.
Qualcomm: "Beam Management for NR", 3GPP Draft; R1-1702604_BEAM_MANAGEMENT_FOR_NR, 3GPP vol. RAN WG1, No. Athens, Greece; Feb. 12, 2017, 8 Pages, XP051209757, Retrieved from the Internet: URL: http://www.3gpp.org/ftp/Meetings_3GPP SYNC/RAN1/Docs/ [retrieved on Feb. 12, 2017].

* cited by examiner

REFERENCE SIGNAL MEASUREMENT AND REPORTING FOR NEW RADIO (NR) SYSTEMS

CROSS REFERENCES

The present Application for Patent claims priority to U.S. Provisional Patent Application No. 62/467,795 by Chendamarai Kannan et al., entitled "Reference Signal Measurement and Reporting For New Radio (NR) Systems," filed Mar. 6, 2017, assigned to the assignee hereof.

TECHNICAL FIELD

The following relates generally to wireless communication, and more specifically to reference signal measurement and reporting for new radio (NR) systems.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (such as a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In wireless communication systems, discovery reference signals (DRSs) may be used to discover and connect to a base station in a network. DRSs may be used in wireless communications systems such as an LTE or NR system and even in some systems that support operation over a shared radio frequency spectrum. In some cases, a base station may send a DRS as a beamformed transmission during a cell acquisition procedure to mitigate path losses (such as, if the base station is communicating at higher frequencies). A UE may measure the DRS and transmit a measurement report to the base station based on the measured DRS. The base station may use the measurement report for making decisions on which base station is to provide the UE with network service. Conventional techniques for DRS transmissions, however, do not address the high directionality of wireless communications using a millimeter wave (mmW) or extremely high frequency (EHF) radio bands.

SUMMARY

The described techniques relate to improved methods, systems, devices, or apparatuses that support reference signal measurement and reporting for new radio (NR) systems. The examples described herein provide a procedure enabling a UE to measure directional beams of a serving base station and one or more target base stations using different antenna subarrays. A base station may instruct a user equipment (UE) to measure a reference signal (e.g., a DRS) during a measurement gap taking into account that reference signal measurements and reports may include a number of variables (e.g., multiple antenna subarrays, multiple beams directions, and multiple radio frequency (RF) chains). The base station may indicate to the UE a type of measurement gap from a number of different measurement gap types, and the UE may perform a reference signal measurement in accordance with the indicated type. A measurement gap may be used to measure and determine which beam and subarray pair has the highest signal strength without interfering with ongoing communications. One or more types of measurement gaps for the UE may be configured by the base station.

In an example, a UE may receive a measurement gap configuration from a base station specifying a measurement gap type of a set of different measurement gap types, and measure, in a measurement gap corresponding to the specified measurement gap type, a reference signal to generate a measurement using a first subarray of a set of subarrays of an antenna array of the UE. In an example, a serving base station may configure measurement gaps to enable a UE to make one or more of intra-cell measurements, inter-cell intra-frequency measurements, and/or inter-frequency measurements of reference signals using different subarrays. The UE may generate a measurement report that indicates the measurement, and transmit the measurement report to the base station.

In some examples, the UE may measure, based at least in part on a supported rank, a reference signal to generate a measurement using a first subarray of a set of subarrays of an antenna array of the UE, and may generate a measurement report, specific to the rank supported by the UE and the first subarray, that indicates the measurement. The UE may transmit the measurement report to the base station. The base station may use the measurement report for selecting a beam and subarray pair for communication.

A method of wireless communication is described. The method may include receiving a measurement gap configuration from a base station specifying a measurement gap type of a plurality of different measurement gap types, measuring, in a measurement gap corresponding to the specified measurement gap type, a reference signal to generate a measurement using a first subarray of a plurality of subarrays of an antenna array of a user equipment (UE), generating a measurement report that indicates the measurement, and transmitting the measurement report to the base station.

An apparatus for wireless communication is described. The apparatus may include means for receiving a measurement gap configuration from a base station specifying a measurement gap type of a plurality of different measurement gap types, means for measuring, in a measurement gap corresponding to the specified measurement gap type, a reference signal to generate a measurement using a first subarray of a plurality of subarrays of an antenna array of a user equipment (UE), means for generating a measurement report that indicates the measurement, and means for transmitting the measurement report to the base station.

Another apparatus for wireless communication is described. The apparatus may include a processor, memory in electronic communication with the processor, and instructions stored in the memory. The instructions may be operable to cause the processor to receive a measurement gap configuration from a base station specifying a measurement gap type of a plurality of different measurement gap types, measure, in a measurement gap corresponding to the specified measurement gap type, a reference signal to generate a measurement using a first subarray of a plurality of subarrays of an antenna array of a user equipment (UE), generate a measurement report that indicates the measurement, and transmit the measurement report to the base station.

A non-transitory computer-readable medium for wireless communication is described. The non-transitory computer-readable medium may include instructions operable to cause a processor to receive a measurement gap configuration from a base station specifying a measurement gap type of a plurality of different measurement gap types, measure, in a measurement gap corresponding to the specified measurement gap type, a reference signal to generate a measurement using a first subarray of a plurality of subarrays of an antenna array of a user equipment (UE), generate a measurement report that indicates the measurement, and transmit the measurement report to the base station.

Another method of for wireless communication is described. The method may include measuring, based at least in part on a rank supported by a user equipment (UE), a reference signal to generate a measurement using a first subarray of a plurality of subarrays of an antenna array of the UE, generating a measurement report, specific to the rank supported by the UE and the first subarray, that indicates the measurement, and transmitting the measurement report to a base station.

Another apparatus for wireless communication is described. The apparatus may include means for measuring, based at least in part on a rank supported by a user equipment (UE), a reference signal to generate a measurement using a first subarray of a plurality of subarrays of an antenna array of the UE, means for generating a measurement report, specific to the rank supported by the UE and the first subarray, that indicates the measurement, and means for transmitting the measurement report to a base station.

Another apparatus for wireless communication is described. The apparatus may include a processor, memory in electronic communication with the processor, and instructions stored in the memory. The instructions may be operable to cause the processor to measure, based at least in part on a rank supported by a user equipment (UE), a reference signal to generate a measurement using a first subarray of a plurality of subarrays of an antenna array of the UE, generate a measurement report, specific to the rank supported by the UE and the first subarray, that indicates the measurement, and transmit the measurement report to a base station.

Another non-transitory computer readable medium for wireless communication is described. The non-transitory computer-readable medium may include instructions operable to cause a processor to measure, based at least in part on a rank supported by a user equipment (UE), a reference signal to generate a measurement using a first subarray of a plurality of subarrays of an antenna array of the UE, generate a measurement report, specific to the rank supported by the UE and the first subarray, that indicates the measurement, and transmit the measurement report to a base station.

Some examples of the method, apparatus, and non-transitory computer-readable medium described above may further include processes, features, means, or instructions for receiving control signaling from the base station. Some examples of the method, apparatus, and non-transitory computer-readable medium described above may further include processes, features, means, or instructions for processing the control signaling to determine a plurality of time intervals over which the reference signal may be transmitted.

Some examples of the method, apparatus, and non-transitory computer-readable medium described above may further include processes, features, means, or instructions for measuring the reference signal during a first time interval of the plurality of time intervals using a second subarray of the plurality of subarrays, wherein measuring the reference signal using the first subarray occurs during a second time interval of the plurality of time intervals.

In some examples of the method, apparatus, and non-transitory computer-readable medium described above, measuring a first symbol of the reference signal during a first time interval of the plurality of time intervals using a second subarray of the plurality of subarrays, wherein measuring the reference signal using the first subarray comprises: measuring a second symbol of the reference signal during the first time interval.

Some examples of the method, apparatus, and non-transitory computer-readable medium described above may further include processes, features, means, or instructions for tuning away from a first frequency to a second frequency, wherein measuring the reference signal using the first subarray occurs while tuned to the second frequency.

Some examples of the method, apparatus, and non-transitory computer-readable medium described above may further include processes, features, means, or instructions for tuning away from a first frequency to a second frequency. Some examples of the method, apparatus, and non-transitory computer-readable medium described above may further include processes, features, means, or instructions for deactivating a second subarray of the plurality of subarrays. Some examples of the method, apparatus, and non-transitory computer-readable medium described above may further include processes, features, means, or instructions for activating the first subarray, wherein measuring the reference signal using the first subarray occurs while tuned to the second frequency.

Some examples of the method, apparatus, and non-transitory computer-readable medium described above may further include processes, features, means, or instructions for determining a partition of the rank to be used for measuring the reference signal. Some examples of the method, apparatus, and non-transitory computer-readable medium described above may further include processes, features, means, or instructions for mapping, based at least in part on the rank partition, a first RF chain of the UE to the first subarray and a second RF chain of the UE to the first subarray or a second subarray of the plurality of subarrays, wherein measuring the reference signal using the first subarray occurs on the first RF chain while the second RF chain simultaneously communicates via the first subarray or the second subarray.

In some examples of the method, apparatus, and non-transitory computer-readable medium described above, measuring the reference signal using the first subarray further comprises: determining an average of the measurement over time.

In some examples of the method, apparatus, and non-transitory computer-readable medium described above, transmitting capability information of the UE to the base station, wherein the capability information indicates: whether the UE supports measurements during measurement gaps, or whether the UE supports measurements during symbol gaps, or whether the UE supports autonomous gaps, or whether partitioning of the rank simultaneously supports communication and measurement of the reference signal, or any combination thereof.

Some examples of the method, apparatus, and non-transitory computer-readable medium described above may further include processes, features, means, or instructions for establishing a connection to the base station using the first subarray or a second subarray of the plurality of subarrays. Some examples of the method, apparatus, and non-transitory computer-readable medium described above may further include processes, features, means, or instructions for selecting which of the plurality of subarrays to use to communicate with the base station based at least in part on the measurement.

In some examples of the method, apparatus, and non-transitory computer-readable medium described above, the measurement report identifies the supported rank and includes an index of the first subarray.

Some examples of the method, apparatus, and non-transitory computer-readable medium described above may further include processes, features, means, or instructions for receiving a measurement gap configuration from the base station, wherein measuring the reference signal may be performed in a measurement gap specified in the measurement gap configuration.

In some examples of the method, apparatus, and non-transitory computer-readable medium described above, the measurement gap configuration instructs the UE to perform an inter-frequency measurement, or perform an intra-frequency measurement, or perform an inter-cell measurement, or perform a sweep through each of the plurality of subarrays, or select what type of measurement to make, and/or any combination thereof.

In some examples of the method, apparatus, and non-transitory computer-readable medium described above, the measurement gap configuration specifies a periodicity and pattern of the measurement gap.

In some examples of the method, apparatus, and non-transitory computer-readable medium described above, measuring the reference signal using the first subarray comprises: measuring the reference signal during an autonomous gap.

Some examples of the method, apparatus, and non-transitory computer-readable medium described above may further include processes, features, means, or instructions for measuring the reference signal using a second subarray of the plurality of subarrays to generate a second measurement, wherein the measurement report includes the second measurement.

A method of wireless communication is described. The method may include transmitting, to a user equipment (UE) including an antenna array that includes a plurality of subarrays, a measurement gap configuration specifying a measurement gap type of a plurality of different measurement gap types, receiving, from the UE, a measurement report having an indication of a reference signal measurement measured within a measurement gap corresponding to the specified measurement gap type using a first subarray of the plurality of subarrays of the UE, selecting a particular subarray of the plurality of subarrays based at least in part on the indication of the reference signal measurement, and transmitting an instruction to the UE to use the particular subarray for communication with a base station.

An apparatus for wireless communication is described. The apparatus may include means for transmitting, to a user equipment (UE) including an antenna array that includes a plurality of subarrays, a measurement gap configuration specifying a measurement gap type of a plurality of different measurement gap types, means for receiving, from the UE, a measurement report having an indication of a reference signal measurement measured within a measurement gap corresponding to the specified measurement gap type using a first subarray of the plurality of subarrays of the UE, means for selecting a particular subarray of the plurality of subarrays based at least in part on the indication of the reference signal measurement, and means for transmitting an instruction to the UE to use the particular subarray for communication with a base station.

Another apparatus for wireless communication is described. The apparatus may include a processor, memory in electronic communication with the processor, and instructions stored in the memory. The instructions may be operable to cause the processor to transmit, to a user equipment (UE) including an antenna array that includes a plurality of subarrays, a measurement gap configuration specifying a measurement gap type of a plurality of different measurement gap types, receive, from the UE, a measurement report having an indication of a reference signal measurement measured within a measurement gap corresponding to the specified measurement gap type using a first subarray of the plurality of subarrays of the UE, select a particular subarray of the plurality of subarrays based at least in part on the indication of the reference signal measurement, and transmit an instruction to the UE to use the particular subarray for communication with a base station.

A non-transitory computer-readable medium for wireless communication is described. The non-transitory computer-readable medium may include instructions operable to cause a processor to transmit, to a user equipment (UE) including an antenna array that includes a plurality of subarrays, a measurement gap configuration specifying a measurement gap type of a plurality of different measurement gap types, receive, from the UE, a measurement report having an indication of a reference signal measurement measured within a measurement gap corresponding to the specified measurement gap type using a first subarray of the plurality of subarrays of the UE, select a particular subarray of the plurality of subarrays based at least in part on the indication of the reference signal measurement, and transmit an instruction to the UE to use the particular subarray for communication with a base station.

Another method of for wireless communication is described. The method may include receiving, from a user equipment (UE) comprising an antenna array that includes a plurality of subarrays, a measurement report having an indication of a reference signal measurement corresponding to a first subarray of the plurality of subarrays and a supported rank of the UE, selecting a particular subarray of the plurality of subarrays based at least in part on the indication of the reference signal measurement, and transmitting an instruction to the UE to use the particular subarray for communication with a base station.

Another apparatus for wireless communication is described. The apparatus may include means for receiving, from a user equipment (UE) comprising an antenna array that includes a plurality of subarrays, a measurement report having an indication of a reference signal measurement corresponding to a first subarray of the plurality of subarrays and a supported rank of the UE, means for selecting a particular subarray of the plurality of subarrays based at least in part on the indication of the reference signal measurement, and means for transmitting an instruction to the UE to use the particular subarray for communication with a base station.

Another apparatus for wireless communication is described. The apparatus may include a processor, memory in electronic communication with the processor, and instructions stored in the memory. The instructions may be operable to cause the processor to receive, from a user equipment (UE) comprising an antenna array that includes a plurality of subarrays, a measurement report having an indication of a reference signal measurement corresponding to a first subarray of the plurality of subarrays and a supported rank of the UE, select a particular subarray of the plurality of subarrays based at least in part on the indication of the reference signal measurement, and transmit an instruction to the UE to use the particular subarray for communication with a base station.

Another non-transitory computer readable medium for wireless communication is described. The non-transitory computer-readable medium may include instructions operable to cause a processor to receive, from a user equipment (UE) comprising an antenna array that includes a plurality of subarrays, a measurement report having an indication of a reference signal measurement corresponding to a first subarray of the plurality of subarrays and a supported rank of the UE, select a particular subarray of the plurality of subarrays based at least in part on the indication of the reference signal measurement, and transmit an instruction to the UE to use the particular subarray for communication with a base station.

Some examples of the method, apparatus, and non-transitory computer-readable medium described above may further include processes, features, means, or instructions for receiving capability information of the UE. Some examples of the method, apparatus, and non-transitory computer-readable medium described above may further include processes, features, means, or instructions for selecting a measurement gap configuration for the UE based at least in part on the capability information.

In some examples of the method, apparatus, and non-transitory computer-readable medium described above, the capability information indicates whether the UE supports measurements during measurement gaps, or whether the UE supports measurements during symbol gaps, or whether the UE supports autonomous gaps, or whether the UE supports simultaneous communication and measurement of a reference signal, or any combination thereof.

Some examples of the method, apparatus, and non-transitory computer-readable medium described above may further include processes, features, means, or instructions for transmitting a reference signal based at least in part on the measurement gap configuration.

Some examples of the method, apparatus, and non-transitory computer-readable medium described above may further include processes, features, means, or instructions for transmitting the reference signal as multiple directional beams in respective time subintervals of a plurality of time intervals.

Some examples of the method, apparatus, and non-transitory computer-readable medium described above may further include processes, features, means, or instructions for normalizing the reference signal measurement relative to a second reference signal measurement of a second subarray of the plurality of subarrays based at least in part on the supported rank.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
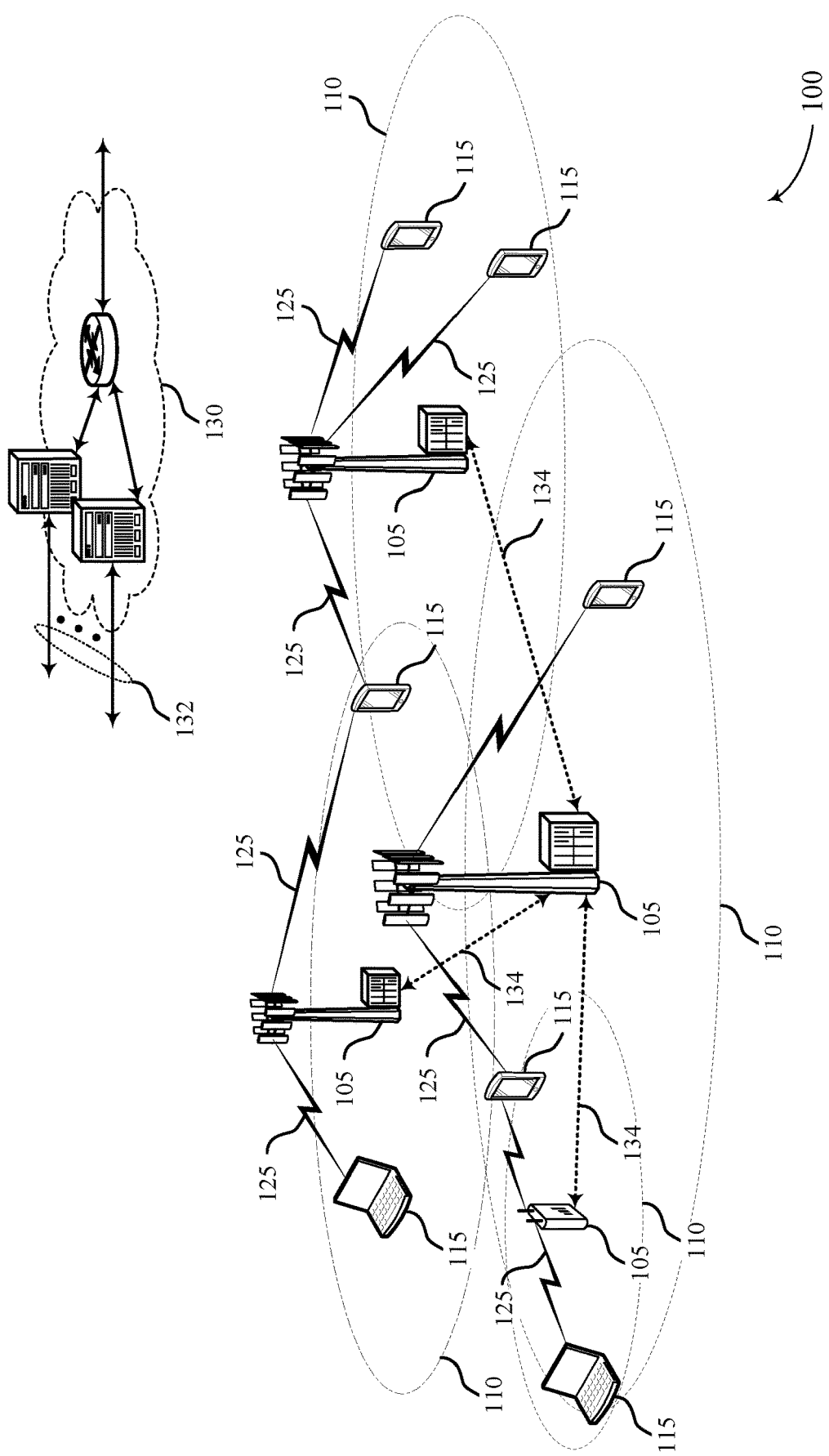
FIG. 1 illustrates an example of a system for wireless communication that supports reference signal measurement and reporting for new radio (NR) systems in accordance with aspects of the present disclosure.

The described techniques relate to improved methods, systems, devices, or apparatuses that support reference signal measurement and reporting for new radio (NR) systems. The examples described herein provide a procedure enabling a user equipment (UE) to measure directional beams of a serving base station and one or more target base stations using different antenna subarrays. A base station may instruct a UE to measure a reference signal (e.g., a DRS) during a measurement gap taking into account that reference signal measurements and reports may include a number of variables (e.g., multiple antenna subarrays, multiple beams directions, and multiple radio frequency (RF) chains). The base station may indicate to the UE a type of measurement gap from a number of different measurement gap types, and the UE may perform a reference signal measurement in accordance with the indicated type. A measurement gap may be used to measure and determine which beam and subarray pair has the highest signal strength without interfering with ongoing communications. One or more types of measurement gaps may be configured by the base station for the UE.

A base station may instruct a UE to measure a reference signal (e.g., a discovery reference signal (DRS)) during a measurement gap. The base station may also indicate to the UE what type of gap the measurement gap should be from a number of different measurement gap types in order to enhance the UE generated measurement reports. For example, the UE may perform intra-cell measurements for subarray selection corresponding to an intra-cell measurement gap type, intra-frequency inter-cell measurements for selection of a cell and subarray corresponding to an intra-frequency inter-cell measurements gap type, inter-frequency measurements for selection of a cell and subarray corresponding to an inter-frequency gap type, any combination thereof, or the like. In accordance with a specified measurement gap type, a measurement gap may be used to measure and determine which beam and subarray pair has the highest signal strength without interfering with ongoing communications on an active subarray.

The described implementations may be implemented in any device, system or network that is capable of transmitting and receiving RF signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

In conventional cellular systems, such as LTE, a serving base station may instruct a UE to measure a reference signal transmitted by a neighboring base station. The UE may measure the transmitted reference signal, generate a report based on the measurement, and transmit the report to the serving base station. The serving base station may process the report to make determinations about which cell should provide service to the UE. Conventional measurement reporting has relatively few variables. A conventional measurement report includes a cell identifier (Cell ID) of a neighbor cell, a Reference Signal Received Power (RSRP) measurement of the neighbor cell, and a Reference Signal Received Quality (RSRQ) measurement of the neighbor cell. Conventional cellular systems also have nominal requirements for when the UE performing reference signal measurements and may or might not require configuration of a measurement gap for the UE to make the measurement. A measurement gap is a time period in which no transmission and reception occurs between a UE and a serving base station. For conventional intra-frequency measurements, measurement gaps are not used to make the RSRP measurement or the RSRQ measurement. For inter-frequency measurements, measurement gaps are provide for performing a RSRP measurement or the RSRQ measurement of a target base station.

In NR systems, base stations and UEs may use beamforming techniques to communicate via directional beams. Transmission via directional beams introduces additional variables not at issue in conventional cellular systems. For instance, a UE may have an antenna array composed of multiple subarrays. A subarray also may be referred to as a panel of antenna elements. During acquisition, a UE establishes a connection with a base station using a particular beam and a particular subarray. The UE, however, may receive a stronger signal from the base station at a different subarray. Moreover, the subarray receiving the strongest signal may vary over time due to, for example, movement of the UE relative to the base station, changes in a communication channel, or the like. The UE, the base station, or both, thus have the time-varying challenge of attempting to maintain communication via a beam and subarray pair having the highest signal strength. To address this challenge, the UE may signal its capabilities of the base station, and the base station may configure the UE with measurement gaps for measuring reference signals. In some instances, the UE may perform intra-cell measurements for subarray selection, intra-frequency inter-cell measurements for selection of a cell and subarray, and inter-frequency for selection of a cell and subarray.

RF chain limitations complicate the ability of the UE to determine which beam and subarray pair has the highest signal strength. In many instances, a UE includes only a single RF chain that can operate only a single subarray at a time. Having a single or limited number of RF chains limits the number of beam directions and subarrays that can be monitored at a time. In many instances, a UE may only be able to monitor a single beam direction at a single subarray at a time. Given that a UE may be unable to simultaneously receive on all subarrays due to RF chain limitations, conventional systems do not provide a suitable mechanism for identifying which beam and subarray pair to use for communication RF chain constrained UEs.

The examples described herein provide a procedure enabling a UE to measure directional beams of a serving base station and one or more target base stations using different subarrays. A serving base station may configure different types of measurement gaps to enable a UE to make intra-cell measurements, inter-cell intra-frequency measurements, and inter-frequency measurements of reference signals using different subarrays.

For a UE having multiple RF chains, conventional systems also fail to intelligently use the multiple RF chains. As described herein, a UE having multiple RF chains may map each RF chain to a particular subarray. Multiple RF chains may simultaneously operate a same subarray, or may operate different subarrays. The number of subarrays that can be simultaneously operated correlates to a supported rank of the UE. In spatial multiplexing, a rank may indicate a number of transmission layers the UE can simultaneously receive, and the UE may signal a rank indication (RI) to a base station to indicate the supported rank.

Conventional systems do not contemplate a UE indicating to a base station that the UE may communicate using a rank less than a maximum rank (such as rank r<rank Rmax) to enable the UE to simultaneously receive and perform directional beam measurements using one or more subarrays. To enable efficient use of multiple RF chains, the examples described herein partition a rank of the UE between two or more RF chains. The UE may use a first RF chain for communication with a base station using less than a full rank and a second RF chain for directional beam measurements with up to a remainder of the rank. In a measurement report, the UE may signal the supported rank, which may be less than full rank, and subarray index to the base station. The base station may use the supported rank and subarray index to make determinations about which beam, subarray, and cell to use for communication with the UE.

To overcome some or all of these issues, the examples described provide for a UE and a base station to coordinate for identifying a particular beam and subarray pair for communication. A UE may measure, based at least in part on a supported rank, a reference signal to generate a measurement using a first subarray of a plurality of subarrays of an antenna array of the UE. The UE may generate a measurement report, specific to the rank supported by the UE and the first subarray, that indicates the measurement. The UE may transmit the measurement report to a base station. The base station may use the measurement report for selecting a beam and subarray pair for communication.

Particular implementations of the subject matter described in this disclosure can be implemented to realize one or more of the following potential advantages. The examples described herein may enable a UE to signal a supported rank in a measurement report to enable use of one or more RF chains for measurement of reference signals. Moreover, a base station may configure a UE with measurement gaps corresponding to the capabilities of the UE. In some instances, the UE may be configured with measurement gaps based at least in part on whether the UE has a single or multiple RF chains.

Aspects of the disclosure are initially described in the context of a wireless communications system. The wireless communications system may configure a UE with measurements gaps for measuring reference signals for selecting a beam and subarray pair for communicating with a base station. Aspects of the disclosure are further illustrated by and described with reference to apparatus diagrams, system diagrams, and flowcharts that relate to reference signal measurement and reporting for new radio (NR) systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

In an example, a base station 105 and a UE 115 may establish a connection that involves selection of a particular beam and subarray for communication. The base station 105 may configure the UE 115 with different types of measurement gaps to enable the UE 115 to perform one or more of intra-cell measurements, intra-frequency inter-cell measurements, inter-frequency measurements, or any combination thereof. The UE 115 may use the measurement gaps to measure reference signals transmitted by the base station 105 or a second base station, and the base stations may operate one or more cells and one or more frequencies. The UE 115 may generate a measurement report that indicates a supported rank and subarray index. In some instances, the UE 115 may measure a reference signal using less than a full rank, and the measurement report may indicate the supported rank, an index of the subarray used for the measurement, and an indication of the measurement. The base station 105 may use the supported rank for comparing the indication of the measurement to other indicated measurements, for making determinations about which beam, subarray, cell, base station, or any combination thereof, to use for providing service to the UE 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (such as between a common control region and one or more UE-specific control regions).

UEs 115 may be dispersed throughout the wireless communications system 100, and each UE 115 may be stationary or mobile. A UE 115 also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 also may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 also may be able to communicate directly with other UEs (such as using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (such as S1, etc.). Base stations 105 may communicate with one another over backhaul links 134 (such as X2, etc.) either directly or indirectly (such as through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 also may be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (such as radio heads and access network controllers) or consolidated into a single network device (such as a base station 105).

Wireless communications system 100 may operate in an ultra-high frequency (UHF) frequency region using frequency bands from 700 MHz to 2600 MHz (2.6 GHz), although some networks (such as a wireless local area network (WLAN)) may use frequencies as high as 4 GHz. This region also may be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (such as less than 100 km) compared to transmission using the smaller frequencies (and longer waves) of the high frequency (HF) or very high frequency (VHF) portion of the spectrum. In some cases, wireless communications system 100 also may utilize extremely high frequency (EHF) portions of the spectrum (such as from 30 GHz to 300 GHz). This region also may be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (such as for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which also may be referred to as spatial filtering or directional transmission) is a signal processing technique that may be used at a transmitter (such as a base station 105) to shape, steer, or both, an overall antenna beam in the direction of a target receiver (such as a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (such as a base station 105) and a receiver (such as a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (such as each transmission may be beamformed differently). A mmW receiver (such as a UE 115) may try multiple beams (such as antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer also may use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (such as in short TTI bursts or in selected component carriers using short TTIs).

A resource element may consist of one symbol period and one subcarrier (such as a 15 KHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier also may be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (such as when multiple serving cells have a suboptimal or non-ideal backhaul link). An eCC also may be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (such as to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (such as 20, 40, 60, 80 MHz, etc.) at reduced symbol durations (such as 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (such as across frequency) and horizontal (such as across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency FDD, TDD, or a combination of both.

The examples provided herein may describe a base station 105 configuring a UE 115 with one or more different measurement gap types, such as measurement gaps for intra-cell measurements, inter-cell intra-frequency measurements, and inter-frequency measurements of reference signals. The measurements may be used for selecting which cell, beam, subarray, base station, or any combination thereof, is to provide the UE 115 with network service.

Figure 2:
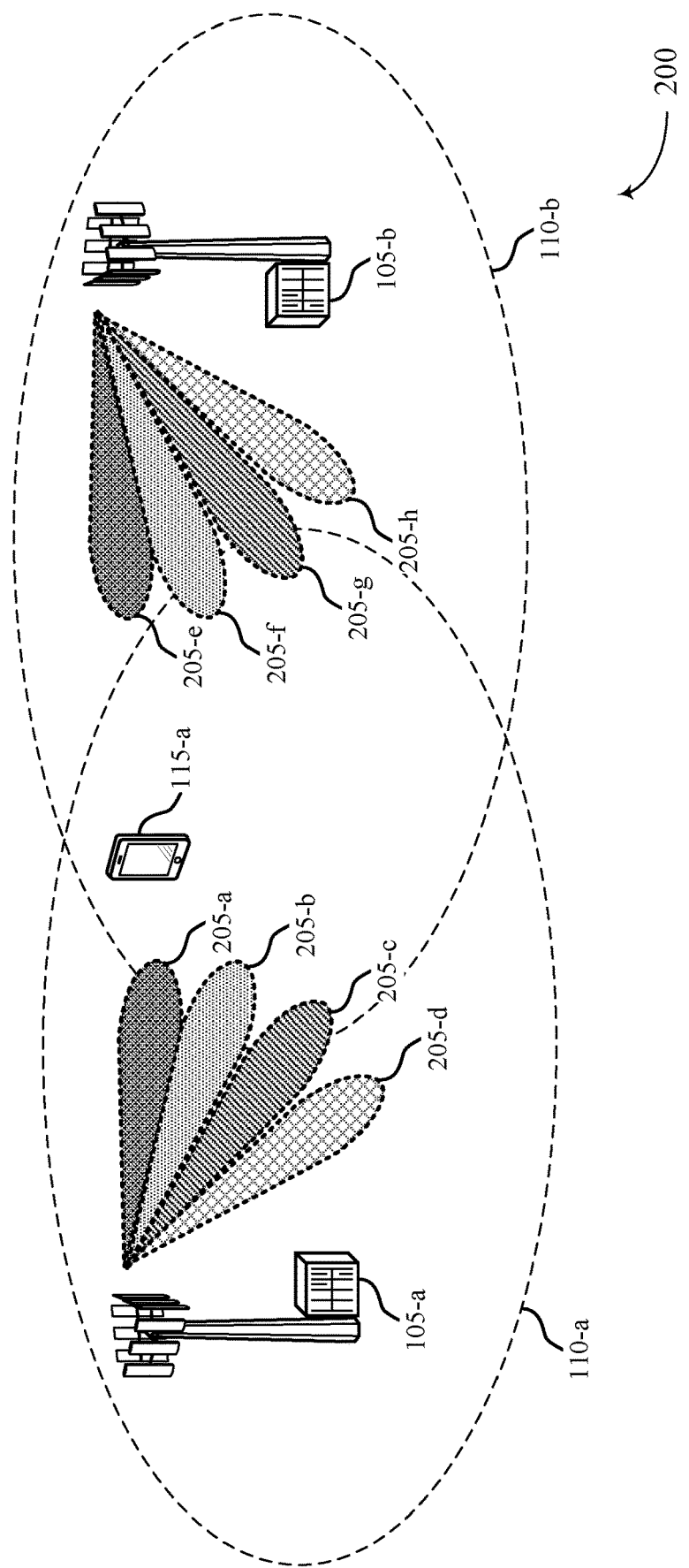
FIG. 2 illustrates an example of a wireless communication system that supports reference signal measurement and reporting for new radio (NR) systems in accordance with aspects of the present disclosure.

FIG. 2 illustrates an example of a wireless communication system 200. Wireless communications system 200 may include a first UE 115-a, a second UE 115-b, and a base station 105-a, which may be examples of the corresponding devices described with reference to FIG. 1.

In wireless communications system 200 (e.g., a mmW system), base station 105-a and UEs 115, such as UE 115-a and UE 115-b, may utilize transmission beams 205 (e.g., directional transmissions) for communications. For example, base station 105-a may transmit signals (e.g., data, DRS, etc.) on transmission beams 205-a, 205-b, 205-c, and 205-d. For example, one or more DRSs may be transmitted in multiple directions (e.g., using different transmission beams 205) to cover a portion of or all of coverage area 110-a of base station 105-a. In the present illustration and the figures that follow, it should be understood teachings described herein may be extended by analogy to any number of transmission beams 205 (e.g., directional transmissions) without departing from the scope of the disclosure.

Base station 105-a may transmit DRS using different beams 205 (e.g., beam 205-a, 205-b, 205-c, and 205-d, among others) to UE 115-a during cell acquisition and subsequently for determining which beam and subarray pair to use. The UE 115-a may include an antenna array having multiple subarrays, and may receive the transmissions using one or more of the antenna subarrays. A DRS transmission may be one or more DRS symbols sent on a directional beam 205 in one or more time slots. UE 115-a and base station 105-a may determine a suitable beam and antenna subarray pair for communication based at least in part on one or more measurements of DRS transmissions by the UE 115-a during a cell acquisition procedure and at subsequent time intervals.

Figure 3:
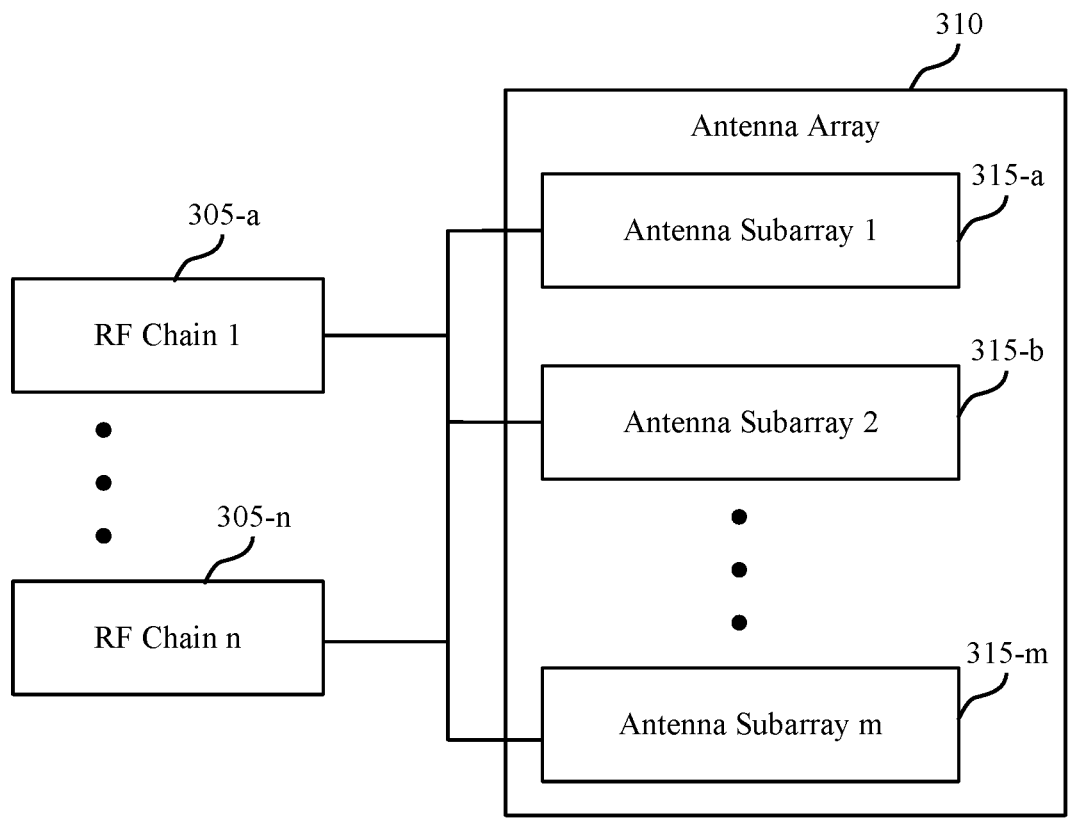
FIG. 3 illustrates an example of radio frequency chains and an antenna array of a user equipment (UE) that supports reference signal measurement and reporting for new radio (NR) systems in accordance with aspects of the present disclosure.

FIG. 3 illustrates an example diagram 300 of a UE 115-a. The UE 115-a may include one or more RF chains 305 and an antenna array 310. A RF chain 305 may include hardware components (e.g., transmitter, receiver, amplifier, and the like) and/or software for transmitting and receiving RF communication with another device, such as a base station. In some instances, a UE 115-a may include a single RF chain 305-a. In other instances, the UE 115-a may have two or more RF chains 305. As depicted, the UE 115-a has RF chains 305-a to 305-n, with n being a positive integer. The antenna array 310 may include one or more subarrays 315. A subarray 315 may also be referred to as a panel of antenna elements. Depicted are subarray 315-a, 315-b, to 315-m, where m is a positive integer, and may be the same or different than n. Each subarray 315 may include one or more physical antenna elements. A physical antenna element may be a hardware component that receives an electromagnetic wave transmitted by a base station 105 (or other UE 115), and may emit an electromagnetic wave.

The UE 115-a may use an RF chain 305 to transmit, receive, or both, via an antenna subarray 315. In some instances, an RF chain 305 may be able to operate a single antenna subarray 315 at a time. A UE 115-a having a single RF chain 305 may be unable to simultaneously monitor multiple subarrays 315. In other examples, the UE 115-*a* may have multiple RF chains 305. The UE 115-*a* may map each RF chain 305 to the same or different subarrays 315 and may transmit or receive via the mapped subarray. An RF chain 305 may also activate and deactivate subarrays when the mapping changes. In an example, for a UE 115-*a* having two RF chains 305, a first RF chain 305 may transmit, receive, or both, using a first subarray 315-*a*, and, at the same or an overlapping time, a second RF chain 305 may transmit, receive, or both, using the same or different subarray 315. In one example, the first RF chain 305 may transmit, receive, or both, using subarray 315-*a*, and, at the same or an overlapping time, the second RF chain 305 may measure a reference signal using subarray 315-*a* (or using a different subarray). In the examples described herein, the UE 115-*a* may control one or more RF chains 305 to measure reference signals received by one or more subarrays for generating a measurement report to send to base station 105-*a*. The base station 105-*a*, the UE 115-*a*, or both, may use the reference signal measurement to select a beam and subarray pair used for communication.

Referring again to FIG. 2, base station 105-*a* may periodically transmit DRS using different beams 205 (such as beam 205-*a*, 205-*b*, 205-*c*, and 205-*d*, among others) to UE 115-*a* to confirm that a current beam and antenna subarray pair remains appropriate. As channel conditions and a geographic location of the UE 115-*a* may vary over time, the UE 115-*a* may periodically measure the DRS transmissions. The times at which the UE 115-*a* measures the DRS transmissions also may vary in accordance with an amount of synchronicity between a first cell operated by the base station 105-*a* and a second cell operated by a second base station 105-*b*. The cells may be synchronous, loosely synchronous, asynchronous, or the like. Synchronous cells may transmit on a same frame and subframe timing. Transmissions, such as DRS transmissions, by synchronous cells may occur at the same time. Frame and subframe timing of cells that differ by less than a defined amount (such as by less than a few milliseconds) may be considered loosely synchronous. Frame and subframe timing of cells that have no particular timing relationship may be considered asynchronous.

Regardless of the type of cell, the UE 115-*a* may periodically measure DRS transmissions. In an example, the UE 115-*a* may perform one or more of intra-cell measurements, inter-frequency measurements, inter-cell intra-frequency measurements of synchronous cells, inter-cell intra-frequency measurements of asynchronous cells, or the like. In an intra-cell measurement, the UE 115-*a* may measure one or more DRS transmissions of base station 105-*a* on a particular beam using one or more of its subarrays 315 on a same frequency on which a connection has been established with the base station 105-*a*. The established connection may be associated with a particular beam (such as beam 205-*a*) transmitted by the base station 105-*a* and a particular subarray 315 (such as subarray 315-*a*) of the UE 115-*a*. A UE 115-*a* receives the particular beam 205-*a* transmitted by the base station 105-*a* using the subarray 315-*a*. As channel conditions and location of the UE 115-*a* may vary over time, the UE 115-*a* may perform intra-cell measurements to aid in identification of an appropriate beam and subarray pair. In an intra-cell measurement, the UE 115-*a* may measure a DRS transmission on the particular beam 205-*a*, and other beams of the base station 105-*a* (such as beams 205-*b*, 205-*c*, and 205-*c*), using one or more different subarrays 315 (such as one or more of subarray 315-*b* to subarray 315-*m*), to determine a measurement of the signal strength at each of the different subarrays 315. The intra-cell measurement may be used to determine that an appropriate one of the beams 205 is being used for communication with the UE 115. If a different beam is better, the base station 105-*a* may initiate a beam switch to a different one of the beams 205.

An inter-frequency measurement is similar to an intra-cell measurement, but measures DRS transmissions of a different base station 105 operating at different frequencies. For example, a UE 115-*a* establishes a connection with a first base station 105-*a* operating at a first frequency. The UE 115-*a* also may be positioned within a coverage area 110-*b* of a second base station 105-*b* that operates at a second frequency. To conduct an inter-frequency measurement, the UE 115-*a* may measure DRS transmissions on one or more beams (such as beams 205-*e*, 205-*f*, 205-*g* and 205-*h*) of a second base station (such as base station 105-*b*) operating at a second frequency, using one or more subarrays 315 (such as one or more of subarray 315-*a* to subarray 315-*m*), to determine a measurement of the DRS transmissions on the beams of the second base station 105-*b* at each of the different subarrays 315. The inter-frequency measurement may be used to determine whether a beam available from the second base station 105-*b* is better than some or all of the beams available from the base station 105-*a*. If a particular subarray 315 of the UE 115 receives a stronger signal from a beam 205 of the second base station 105-*b*, the base station 105-*a* may initiate a handover of the UE 115-*a* to the second base station 105-*b*.

An intra-frequency inter-cell measurement of synchronous cells is a DRS measurement of different synchronous cells that operate using the same frequency. In some examples, a single base station 105-*a* may operate multiple cells. In another example, a first base station 105-*a* may operate a first cell, and a second base station 105-*b* may operate a second cell. In either example, the cells may be synchronous and the base station 105-*a*, 105-*b*, or both, may output a timing signal with which the UE 115-*a* synchronizes. A UE 115-*a* may establish a connection with base station 105-*a* operating at a first frequency. To conduct an intra-frequency inter-cell measurement, the UE 115-*a* may measure DRS transmissions on one or more beams of a second cell of the base station 105-*a* (or the second base station 105-*b*) also operating at the first frequency, using one or more subarrays 315 (such as one or more of subarray 315-*a* to subarray 315-*m*), to determine a measurement of the DRS transmission of the second cell at each of the different subarrays 315. If a particular subarray 315 if the UE 115 receives a stronger signal from a beam 205 of the different cell, the base station 105-*a* may initiate a handover of the UE 115-*a* to the different cell. A similar procedure may be followed for loosely synchronous cells, with the base station 105-*a* configuring the UE 115-*a* with measurement gaps corresponding to DRS transmission times of a different cell operated by the base station 105-*a* or the second base station 105-*b*.

An intra-frequency inter-cell measurement for asynchronous cells is similar to the intra-frequency inter-cell measurement of synchronous cells, but base station 105-*a* may configure the UE 115-*a* with measurement gaps corresponding to DRS transmission times of a different cell operated by the base station 105-*a* or the second base station 105-*b*.

The UE 115-*a* may make one or more different types of measurements of one or more base stations using one or more of its subarrays. For example, the UE 115-*a* may make one or more intra-cell measurements, one or more inter-frequency measurements, one or more intra-frequency inter-cell measurements of synchronous cells, one or more intra-frequency inter-cell measurements of asynchronous cells, or any combination thereof. Each type of measurements may be made using one or more of the subarrays 315.

The UE 115-a may generate a measurement report that includes one or more intra-cell measurements, one or more inter-frequency measurements, one or more intra-frequency inter-cell measurements of synchronous cells, one or more intra-frequency inter-cell measurements of asynchronous cells, or any combination thereof. For each measurement, the UE 115-a may indicate in the measurement report (1) the type of measurement (such as intra-cell measurement, inter-frequency measurement, intra-frequency inter-cell measurement, etc.), (2) an identifier of the cell, base station, or both, that was measured, (3) an identifier of a beam that was measured, (4) a frequency that was measured, (5) a subarray 315 used to perform the measurement, (5) an indication of the measurement, (6) a rank used for the measurement, or any combination thereof. The indication of the measurement may be a measured signal level, or may be an indication of the measure signal level. The measured signal level may be, for example, a signal quality measurement, a signal strength measurement, a signal to noise ratio, a signal to interference plus noise ratio, a signal power measurement, or the like. The measurement may also be a statistical value, such as an average over time.

The UE 115-a may transmit the measurement report to the base station 105-a. The base station 105-a may process the measurement report to select a beam and antenna subarray pair to use for communication with the UE 115-a. If the current beam and antenna subarray pair has the highest signal strength, the base station 105-a may permit the UE 115-a to continue using that pair. If a different beam and antenna subarray pair has a higher signal strength, the base station 105-a may instruct the UE 115-a to use the different beam and antenna subarray pair. In some instances, the base station 105-a may instruct the UE 115-a to perform a handover to a different base station 105-b that provides a beam and antenna subarray pair to use for communication with the UE 115-a.

The examples provided herein describe a procedure for efficiently configuring a UE 115-a with measurement gaps for measuring DRS transmissions. In some instances, a base station 105 transmits DRS in a directional beam that is directed away from the UE 115-a, or the UE 115-a may have unused RF chains. The base station 105 may configure measurement gaps, and enable to the UE 115-a to autonomously perform measurements, to enable the UE 115-a to efficiently perform DRS measurements, as described below.

Figure 4:
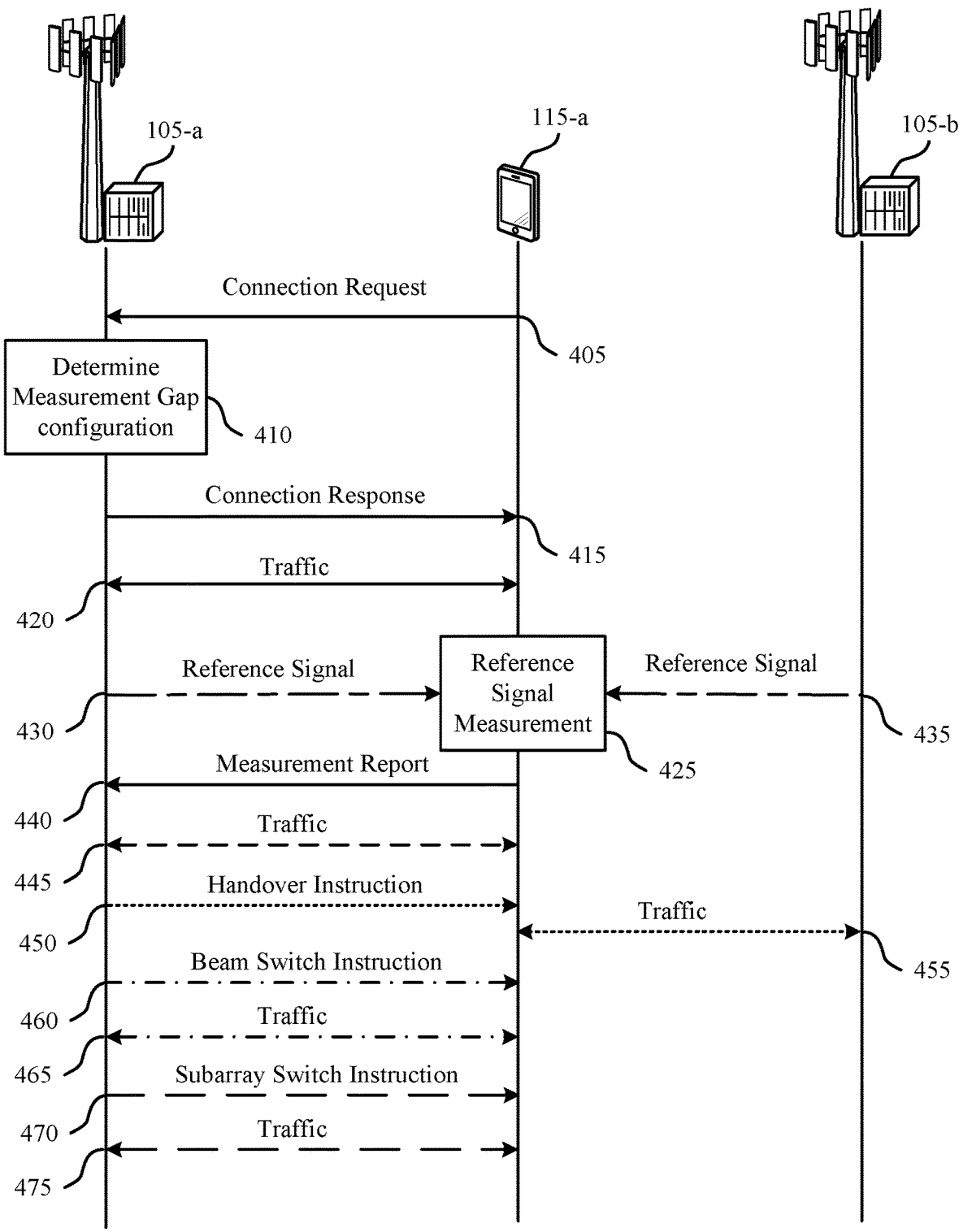
FIG. 4 illustrates an example of a reference signal timing diagram that supports reference signal measurement and reporting for new radio (NR) systems in accordance with aspects of the present disclosure.

FIG. 4 illustrates an example of a process flow 400. Depicted are base stations 105-a and 105-b, and a UE 115-a. At some time, the UE 115-a may, at 405, communicate a connection request to the base station 105-a requesting to establish a connection with the base station 105-a. The UE 115-a, for example, may use radio resource control (RRC) signaling for requesting to establish a connection with the base station 105-a. The connection request may include capability information of the UE 115-a. The capability information may inform the base station 105-a about what types of measurements the UE 115-a is capable of making. In an example, the capability information may indicate whether the supports measurements during DRS gaps, during DRS symbol gaps, during autonomous gaps, or the like, or any combination thereof. In other examples, the capability information may indicate whether the UE 115-a a supported rank. In some instances, the UE 115-a may have multiple RF chains 305-a and may indicate, in the capability information, less than a full rank to enable the UE 115-a to simultaneously operate multiple RF chains for simultaneous reception using a subarray 315 and DRS measurements using the same or different subarray 315.

At 410, the base station 105-a may process the connection request, and the capability information, to determine a measurement gap configuration for the UE 115-a. The measurement gap configuration may specify under what circumstances the UE 115-a is permitted to perform DRS measurements using different beam and subarray pairs. The base station 105-a may analyze the timing and directionality of DRS transmissions to provide the UE 115-a with opportunities to perform the various DRS measurements.

Figure 5:
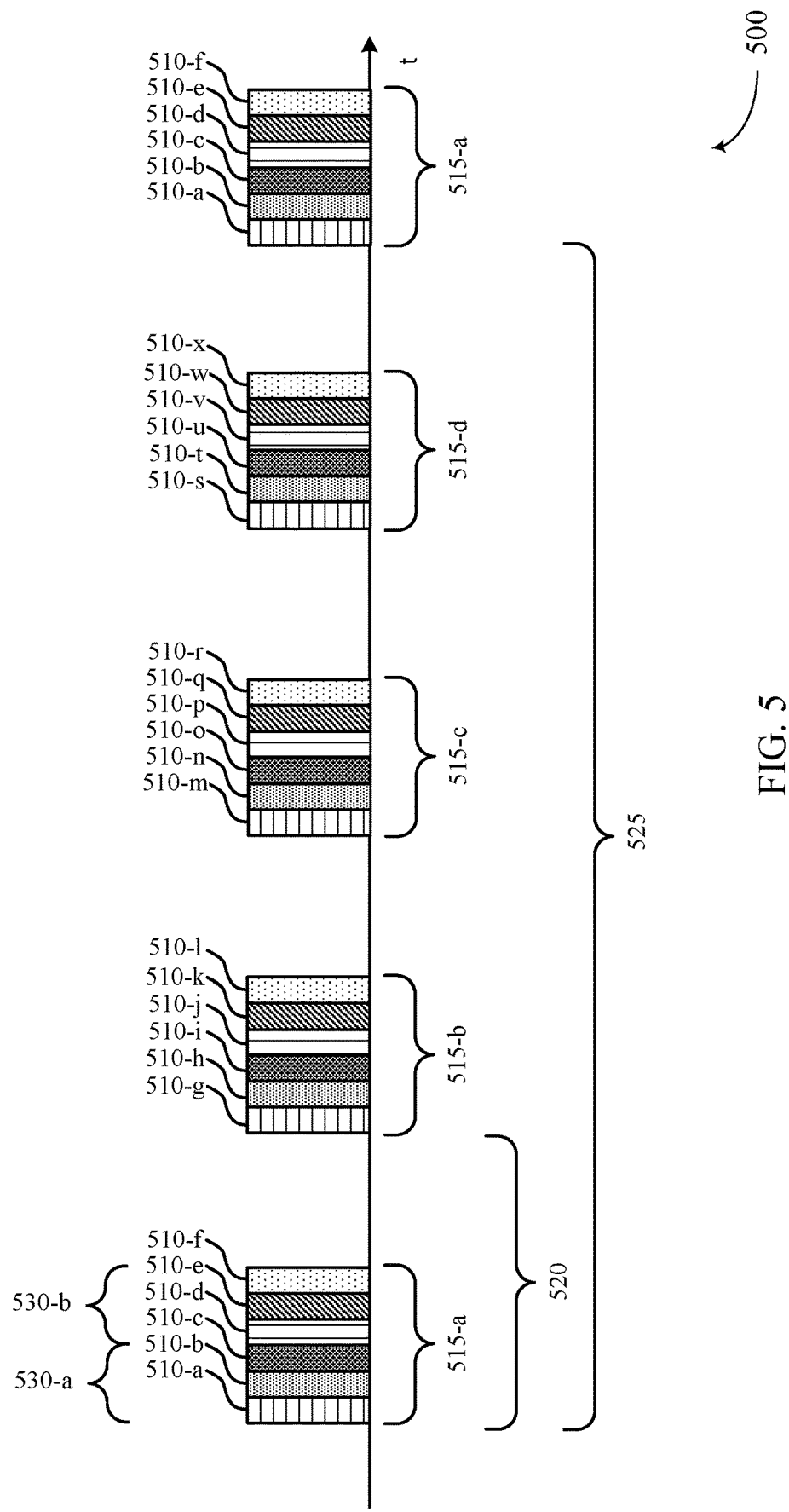
FIG. 5 illustrates an example of a process chart that supports reference signal measurement and reporting for new radio (NR) systems in accordance with aspects of the present disclosure.

FIG. 5 illustrates an example of a reference signal timing diagram 500. The base station 105-a may periodically transmit a reference signal (e.g., a DRS) in multiple directional beams 510 in multiple time intervals 515. Directional beam 510 is an example of directional beam 205 of FIG. 2. The time intervals 515 may occur periodically (e.g., every 10, 20, or 40 ms) at fixed locations (e.g., at the beginning of a period 520). In an example, in time interval 515-a, the base station 105-a may transmit directional beams 510-a to 510-f, in time interval 515-b, the base station 105-a may transmit directional beams 510-g to 510-l, in time interval 515-c, the base station 105-a may transmit directional beams 510-m to 510-r, and in time interval 515-d, the base station 105-a may transmit directional beams 510-s to 510-x.

In some instances, the base station 105-a may transmit the directional beams 510 in a defined number of directions to cover a portion of or all of coverage area 110-a (see also FIG. 2), and, over time, may cycle through transmitting in each of the defined number of directions. For example, if the base station 105-a transmits beams 510 in 6 different directions, the base station 105-a may transmit a direction beam 510 in each of the 6 directions in consecutive time subintervals of time interval 515. The base station 105-a may periodically transmit the beams 510, such as in a repeating time periods 520. While not shown, the base station 105-a, the UE 115-a, or both, may transmit and receive data traffic during a remainder of each time period 520. The time interval 515 and the time period 520 are not depicted to scale. For example, the time interval 515 may be a percentage of a duty cycle over a period of time 520. For example, the time interval 515 may be allocated less than X % of the time period 520.

In some other instances, the base station 105-a may require multiple time intervals 515 to complete transmitting a reference signal in each of the directions. For example, if the base station 105-a transmits in 24 different directions, the base station 105-a may transmit 6 of the 24 directional beams 510 per time interval 515. As depicted, the base station 105-a may complete transmitting a directional beam 510 in each of the 24 different directions at the end of the time interval 515-d. The base station 105-a may then start over and repeat transmitting the directional beams 510 with periodicity 525. In some instances, the time period 520 and the periodicity 525 may be the same.

As the base station 105-a cycles through transmitting the beams 510 in different directions, there may be times where the base station 105-a is transmitting a directional beam 510 away from the UE 115-a. Because beamforming techniques focus energy of a directional beam 510 in a particular direction, the UE 115-a may only be able to detect a subset of the directional beams 510, or a signal strength of a subset of the directional beams 510 falls below a threshold, or the like. The examples described herein may exploit the directionality of the beams 510 to provide the UE 115-a with additional measurement opportunities, as described below.

In an example, the base station 105-*a* may process the capability information to determine that the UE 115-*a* supports measurements in DRS gaps. A UE 115-*a* supporting measurements in DRS gaps is capable of performing DRS measurements during a time interval in which DRS transmissions are made (such as within time interval 515-*a*). The base station 105-*a* may configure the UE 115-*a* with measurement gaps that coincide with the time intervals 151. In an example, the base station 105-*a* may cycle through consecutively sending 24 directional beams 510 in time intervals 515-*a*, 515-*b*, 515-*c*, and 515-*d*, with 6 of the 24 beams being sent in each time interval 515. The base station 105-*a* may determine its geographic location relative to the UE 115-*a*, and determine that some of the beams 510 are being sent in a direction away from the UE 115-*a*. For example, a cell of the base station 105-*a* may cover 120 degrees, and the 24 directional beams 510 may be separated by 5 degree increments. The base station 105-*a* may determine that only directional beams 510-*a* to 510-*f* are being transmitted in the direction of UE 115-*a*, and the remaining directional beams 510-*g* to 510-*x* are being transmitted away from UE 115-*a*. The base station 105-*a* may generate a measurement gap configuration to configure the UE 115-*a* with measurement gaps corresponding to time intervals 515-*b*, 515-*c*, and 515-*d*. During those intervals, the UE 115-*a* may perform intra-cell measurements, inter-frequency measurements, intra-cell inter-frequency measurements, or any combination thereof, in accordance with the measurement gap configuration provided by base station 105-*a*.

In some instances, the base station 105-*a* may process the capability information to determine that the UE 115-*a* supports measurements during DRS symbol gaps. A UE 115-*a* supporting measurements during DRS symbol gaps is capable of performing DRS measurements during one or more time subintervals of the time interval 515 in which DRS transmissions are made (such as within time interval 515-*a*). A time subinterval 530 may correspond to a duration in time for transmitting one or more DRS symbols in one or more directional beam 510. A width of the time subinterval 530 may also be referred to a symbol gap. With reference to FIG. 5, for example, a time subinterval 530-*a* may correspond to a duration of three directional beams, 510-*a*, 510-*b*, and 510-*c*. In other examples, the time subinterval 530-*a* may correspond to the duration of a single directional beam, or shorter, or longer. For example, a cell of the base station 105-*a* may cover 120 degrees, and the 24 directional beams 510 may be separated by 5 degree increments. The base station 105-*a* may determine that only directional beams 510-*a* to 510-*c* are being transmitted in the direction of UE 115-*a*, and the remaining directional beams 510-*d* to 510-*x* are being transmitted away from UE 115-*a*. The base station 105-*a* may generate a measurement gap configuration to configure the UE 115-*a* with measurement gaps corresponding to time subinterval 530-*b*, and time intervals 515-*b*, 515-*c*, and 515-*d*. During time subinterval 530-*b*, and time intervals 515-*b*, 515-*c*, and 515-*d*, the UE 115-*a* may perform intra-cell measurements, inter-frequency measurements, intra-cell inter-frequency measurements, or any combination thereof, in accordance with the measurement gap configuration provided by base station 105-*a*.

In some other cases, the base station 105-*a* may process the capability information to determine that the UE 115-*a* supports autonomous gaps. If supported, the base station 105-*a* may provide the UE 115-*a* with information on when to measure autonomously. For example, the base station 105-*a* may provide the UE 115-*a* information (e.g., measurement gap configuration) about when, and when not, to perform a measurement. For example, the information may identify idles times where a particular beam is known not to be of interest to the UE 115-*a*, such as the transmission time of DRS or random access channel (RACH) locations in beam directions transmitted away from the UE 115-*a*. The information may also identify non-idle times to prevent the UE 115-*a* from initiating an autonomous gap when the UE 115-*a* may miss information from the base station 105-*a* being transmitted to the UE 115-*a*. The non-idle times, for example, may correspond to transmission times of a control channel (such as physical downlink control channel (PDCCH)), some or all of a shared data channel (such as a physical downlink shared channel (PDSCH)), or the like.

The UE 115-*a* may use an autonomous gap to perform intra-cell and inter-cell measurements, and inter-frequency measurements, in accordance with the measurement gap configuration provided by base station 105-*a*. During an autonomous gap, the UE 115-*a* may tune away from the base station 105-*a* to measure a directional beam 510 from a different base station 105-*b* using a same or different subarray 315 used to communicate with the base station 105-*a*. The base stations 105-*a* and 105-*b* may operate using the same or different frequencies. In another example, during an autonomous gap, the UE 115-*a* may activate a different subarray, such as subarray 315-*b*, to measure a directional beam 510 from the base station 105-*a* than the subarray, such as 315-*b*, used to communicate with the base station 105-*a*.

In some cases, the base station 105-*a* may process the capability information to determine that the UE 115-*a* supports rank partitioning to enable simultaneous communication and measurement. For instance, consider a scenario where the UE 115-*a* has multiple RF chains, the UE 115-*a* could either use one sub-array at a time to connect to one RF chain at full rank transmission/reception, or the UE 115-*a* could divide its RF chains among sub-arrays with each RF chain supporting less than full rank reception/transmission. The UE 115-*a* may leverage this to partition its rank. For example, the UE 115-*a* may simultaneously receive with subarray 315-*a* with less than its full rank capability (such as indicate to the base station 105-*a* that UE 115-2 can receive only rank r<Rmax for a certain duration) and simultaneously measure (1) intra-cell (same time as its own DRS), (2) inter-cell, intra-frequency sync. (same time as its own DRS), inter-cell, (3) intra-frequency asynchronous cell (same time as its own signals including DRS, PDSCH, PDCCH), (4) inter-cell, inter-frequency synchronous cell (same time as its own signals including DRS, PDSCH, PDCCH), or any combination thereof.

For example, the capability information may indicate that the UE 115-*a* includes multiple RF chains. If the UE 115-*a* has multiple RF chains, a first RF chain of the UE 115-*a* may be capable of transmitting, receiving, or both, using a first subarray 315-*a* while, at the same or an overlapping time, a second RF chain of the UE 115-*a* may be configured for performing a DRS measurement using the first subarray 315-*a* or a different subarray 315-*a* of the antenna array 310. To enable simultaneous communication and measurement, the base station 105-*a* may schedule a lower rank during some or all of time intervals 515 to enable the UE 115-*a* to partition the rank to enable simultaneous communication and reception. In an example, a UE 115-*a* may have two RF chains 305-*a*, 305-*b* that support a 4 layer rank, with 2 or 4 layers capable of being operated by each RF chain 305. In some instances, the UE 115-*a* may partition the rank to enable simultaneous operation of the two RF chains 305, with one of the RF chains (such as RF chain 305-*a*) being used to DRS measurement and the other RF chain (such as RF chain 305-*m*) for communication with the base station 105. To enable simultaneous operation, the UE 115-*a* may indicate in the capability information that less than the full rank is to be used for reference signal measurements. In other examples, the UE 115-*a* may indicate its full rank in the capability information and indicate that the UE 115-*a* has multiple RF chains 305 and supports rank partitioning.

In a further example, the base station 105-*a* may process the capability information to determine that the UE 115-*a* have two RF chains 305, and supports rank partitioning of a 4 layer rank. During time interval 515-*a*, the base station 105-*a* may generate a measurement gap configuration to configure the UE 115-*a* to measure a 2 layer DRS transmission during time interval 515-*a*. During time interval 515-*a*, a first RF chain 305-*a* of the UE 115-*a* may operate a first subarray 315-*a* to receive the DRS transmission from the base station 105-*a*. Also during time interval 515-*a*, a second RF chain 305-*b* of the UE 115-*a* may operate the first subarray 315-*a* (or a different subarray 315) to receive the 2-layer DRS transmission from the base station 105-*a* to make an intra-cell DRS measurement. In another example, during time interval 515-*a*, a second RF chain 305-*b* of the UE 115-*a* may operate a first subarray 315-*a*, or a different subarray 315, to receive a 2-layer DRS transmission from a second base station 105-*b* to make an intra-frequency inter-cell DRS measurement, an inter-frequency DRS measurement, or the like. The base station 105-*a* may also specify in the measurement gap configuration that the UE 115-*a* is use the RF chains 305 to sweep through each of the subarrays 315 in a particular order, or a UE-selected order, during the time intervals 515.

With reference again to FIG. 5, the base station 105-*a* may, at 515, communicate a connection request to the UE 115-*a* for establishing a connection with the UE 115-*a*. The base station 105-*a*, for example, may use radio resource control (RRC) signaling for establishing a connection with the UE 115-*a*. The connection request may include a measurement gap configuration.

The measurement gap configuration may specify a periodicity and pattern of a measurement gap. In FIG. 5, for example, the base station 105-*a* may inform the UE 115-*a* that measurement gaps have a periodicity of every 10 milliseconds, and that 6 beams 510 are consecutively sent at the beginning of each period 520. The pattern may be referred to as a beam sweep pattern that follows the specified periodicity. For example, the pattern may specify a repetition period 525 indicating the duration of time to complete transmission of the beams 510 before repeating. In a 24 beam example, it takes 4 periods to complete transmission of the beams 510-*a* to 510-*x*, and then the DRS transmission repeats. In some instances, repetition period 525 and period 520 may be the same (such as for a DRS transmission of 6 beams). In FIG. 5, a first base station 105-*a* is described as transmitting each of the directional beams 510. Other base stations also may transmit directional beams within the same time intervals 515, and thus the UE 115-*a* may tune to a desired one of the base stations 105 during any of time intervals 515 for receiving directional beams from the desired base station.

The measurement gap configuration may inform the UE 115-*a* when to make intra-cell DRS measurements. For example, the base station 105-*a* may determine to establish a connection to the first UE 115-*a* via a first directional beam to be received by a first subarray 315-*a* of the UE 115-*a*. The first directional beam may, for example, be sent in the same direction as directional beam 510-*c*.

The measurement gap configuration may instruct the UE 115-*a* to perform DRS measurements of directional beams 510-*a* to 510-*f* during time interval 515-*a* using the subarray 315-*a*, and that the UE 115-*a* may make other DRS measurements in the time intervals 515-*b*, 515-*c*, and 515-*d*. In a further example, if the UE is capable of measuring time subintervals within a time interval 515, the measurement gap configuration may instruct the UE 115-*a* to perform DRS measurements of the time subinterval 530-*a* that includes directional beam 510-*c* using the subarray 315-*a*, and that the UE 115-*a* may make other DRS measurements in time subinterval 530-*b* and the time intervals 515-*b*, 515-*c*, and 515-*d*.

If, for example, the UE 115-*a* has a single RF chain 305, the measurement gap configuration may enable the UE 115-*a* to at least occasionally make intra-cell DRS measurements of the base station 105-*a* using subarrays other than subarray 315-*a* in repetitions of time interval 515-*a*. For example, the measurement gap configuration may enable the UE 115-*a* to at least occasionally cycle through the other subarrays (such as subarrays 315-*b* to 315-*m*) to perform DRS measurements of directional beams 510-*a* to 510-*f* using a respective one of the other subarrays when the directional beams 510-*a* to 510-*f* are repeated.

For example, the UE 115-*a* may measure directional beams 510-*a* to 510-*f* using a subarray other than subarray 315-*a* during time interval 515-*a* once every defined number of repetition periods 525. Similarly, if the UE 115-*a* supports measurements during time subintervals 530, the UE 115-*a* may measure directional beams 510-*a* to 510-*c* using a subarray other than subarray 315-*a* during time subinterval 530-*a* once every defined number of repetition periods 525. The frequency at which the other subarrays measure directional beams 510-*a* to 510-*f* may depend on a DRS signal strength measured by the first subarray 315-*a*. For example, the UE 115-*a* may measure directional beams 510-*a* to 510-*f* with other subarrays than first subarray 315-*a* more frequently when a lower DRS signal strength is measured by the first subarray 315-*a*, and less frequently when a higher DRS signal strength is measured by the first subarray 315-*a*. In the other time intervals 515-*b*, 515-*c*, and 515-*d*, the UE 115-*a* may cycle through the subarrays 315-*a* to 315-*m* and the directional beams 510-*g* to 510-*x* to perform DRS measurements on the various beam and subarray pairs.

If, for example, the UE 115-*a* has multiple RF chains 305, the measurement gap configuration may enable the UE 115-*a*, during time interval 515-*a* (or time subinterval 530-*a*), to simultaneously receive via the first subarray 315-*a* and measure DRS using a different subarray, such as subarray 315-*b*. The UE 115-*a* may partition its rank to enable a first RF chain to operate the first subarray 315-*a* and a second RF chain to operate a different subarray.

During the remaining time intervals 515-*b*, 515-*c*, and 515-*d*, the UE 115-*a* may cycle through any of subarrays 315-*a* to 315-*m* to perform DRS measurements of the directional beams 510-*g* to 510-*x*. If rank partitioning is supported and the UE 115-*a* has two or more RF chains, the UE 115-*a* may cycle through subarrays 315-*a* to 315-*m* and may simultaneously perform DRS measurements of the directional beams 510-*g* to 510-*x* using the two or more RF chains.

For intra-frequency inter-cell DRS measurements of synchronous or asynchronous cells, the measurement gap configuration may configure the UE 115-*a* with measurement gaps in which to perform measurements in a manner similar to the discussion provided above on the intra-cell DRS measurements, but with the UE 115-*a* measuring DRS of a different cell of base station 105-*a* or a cell operated by a second base station 105-*b*. For asynchronous cells, the base station 105-*a* may configure the UE 115-*a* with measurement gaps corresponding to DRS transmission times by the different cell of the base station 105-*a* or a second base station 105-*b*.

For inter-frequency DRS measurements, the UE 115-*a* may communicate with base station 105-*a* using a first frequency, and the UE 115-*a* may tune away at least one of its RF chains to measure DRS at a second frequency at which a different cell of the base station 105-*a* operates, or at which a different cell of a different base station 105-*b* operates. The measurement gap configuration may configure the UE 115-*a* with measurement gaps in which to perform DRS measurements in a manner similar to the discussion provided above on the intra-cell DRS measurements, but with the UE 115-*a* tuning away from a first frequency to measure DRS at the second frequency during each measurement gap.

The measurement gap configuration also may provide the UE 115-*a* with information for creating an autonomous gap for intra-cell DRS measurements, the intra-frequency inter-cell DRS measurements, the inter-frequency measurements, or any combination thereof. The information may indicate time periods during which the UE 115-*a* may independently determine when to measure DRS transmitted by the base station 105-*a*.

The measurement gap configuration may also enable the UE 115-*a* to determine when, and what type, of DRS measurement to make. Thus, the UE 115-*a* may make decisions about when to make intra-cell DRS measurements, the intra-frequency inter-cell DRS measurements, the inter-frequency measurements, or any combination thereof, in accordance with the measurement gap configuration.

At 415, the base station 105-*a* may transmit a connection response to the UE 115-*a* that includes the measurement gap configuration. The connection response may be, for example, RRC signaling for establishing a connection.

At 420, the base station 105-*a* and the UE 115-*a* may communicate via the established connection. The UE 115-*a* may also apply the configuration specified in the measurement gap configuration to determine when, and what type of, DRS measurements to make.

At 425, the UE 115-*a* may perform a measurement of a reference signal transmitted by a base station 105-*a* (see 430), base station 105-*b* (see 435), or both. As described above, the base station 105-*a* may transmit a measurement gap configuration to the UE 115-*a*, and the UE 115-*a* may measure a reference signal in accordance with the measurement gap configuration. The base station 105-*a*, base station 105-*a*, or both, may transmit the reference signal in accordance with the capabilities of the UE 115-*a*. For example, the base station 105-*a* may transmit a DRS transmission of a reduced rank to enable use of multiple RF chains 305 by the UE 115-*a*. The base station 105-*a* may also not simultaneously transmit the reference signal for measurement and data to a UE 115-*a* having a single RF chain.

For an intra-cell measurement, the UE 115-*a* may, as described above, use one or more RF chains to perform measurements of reference signal of the base station 105-*a* using one or more subarrays of the antenna array. For example, a UE 115-*a* having a single RF chain 305-*a* may measure directional beams 510-*a* to 510-*e* using a first subarray 315-*a* during interval 515-*a*, and may measure directional beams 510-*g* to 510-*x* using a second subarray 315-*b* during time intervals 515-*b*, 515-*c*, and 515-*d*. In another example, the UE 115-*a* having two RF chains 305-*a*, 305-*b*, may measure directional beams 510-*a* to 510-*e* using a first subarray 315-*a* during interval 515-*a*, and measure directional beams 510-*a* to 510-*e* using a second subarray 315-*b* during interval 515-*a*. The UE 115-*a* may similarly measure directional beams 510-*g* to 510-*x* using each of subarrays 315-*a* and 315-*b* during time intervals 515-*b*, 515-*c*, and 515-*d*. The base station 105-*a* may specify in the measurement gap configuration that the UE 115-*a* is use the RF chains 305 to sweep through each of the subarrays 315 in a particular order, or a UE-selected order, during the time intervals 515.

For an intra-frequency inter-cell measurement, the UE 115-*a* may, as described above, use one or more RF chains to perform measurements of reference signal of the base station 105-*b* using one or more subarrays of the antenna array on the same frequency as used by base station 105-*a*. For example, a UE 115-*a* having a single RF chain 305-*a* may measure directional beams 510-*a* to 510-*e* of a first base station 105-*a* using a first subarray 315-*a* during interval 515-*a*, and may measure directional beams 510-*g* to 510-*x* of a second base station 105-*b* using a second subarray 315-*b* during time intervals 515-*b*, 515-*c*, and 515-*d*. In another example, the UE 115-*a* having two RF chains 305-*a*, 305-*b*, may measure directional beams 510-*a* to 510-*e* of a first base station 105-*a* using a first subarray 315-*a* during interval 515-*a*, and measure directional beams 510-*a* to 510-*e* of a second base station 105-*b* using a second subarray 315-*b* during interval 515-*a*. The UE 115-*a* may similarly measure directional beams 510-*g* to 510-*x* transmitted by each the first and second base stations 105-*a* and 105-*b* using each of subarrays 315-*a* and 315-*b* during time intervals 515-*b*, 515-*c*, and 515-*d*.

For inter-frequency measurement, the UE 115-*a* may use one or more RF chains to perform a tuneaway to measure one or more reference signals of the base station 105-*b* using one or more subarrays of the antenna array on a different frequency than used by base station 105-*a*. For example, a UE 115-*a* having a single RF chain 305-*a* may measure directional beams 510-*a* to 510-*e* of a first base station 105-*a* using a first subarray 315-*a* during interval 515-*a*, and may measure directional beams 510-*g* to 510-*x* of a second base station 105-*b* using a second subarray 315-*b* during time intervals 515-*b*, 515-*c*, and 515-*d*. In another example, the UE 115-*a* having two RF chains 305-*a*, 305-*b*, may measure directional beams 510-*a* to 510-*e* of a first base station 105-*a* using a first subarray 315-*a* during interval 515-*a*, and measure directional beams 510-*a* to 510-*e* of a second base station 105-*b* using a second subarray 315-*b* during interval 515-*a*. The UE 115-*a* may similarly measure directional beams 510-*g* to 510-*x* transmitted by each the first and second base stations 105-*a* and 105-*b* using each of subarrays 315-*a* and 315-*b* during time intervals 515-*b*, 515-*c*, and 515-*d*.

The UE 115-*a* may generate a measurement report that indicates one or more DRS measurements. In some examples, the measurement report may include a measured value of the reference signal (such as signal strength, signal quality, or the like). In other examples, the measurement report may not include the measured value, but an indication of the measured value. The indication may be an index, for example, to a lookup table representing the measured value.

In some instances, the measurement report may be specific to the rank supported by the UE 115-*a* and the subarray used by the UE 115-*a* to make the measurement. In some instances, the UE 115-*a* may use less than its full rank to perform the DRS measurement. In some cases, the base station 105-*a* may or might not be aware of the rank used for the DRS measurement. To inform the base station 105-*a* of the rank used for the measurement, the measurement report may include a rank indication (RI) and an index of a subarray used for the measurement. The RI may indicate the number of spatial multiplexing layers used by the UE 115-*a* to measure the DRS. The base station 105 may use the identified rank for interpreting the measurement and to enable normalizing of measurements to account for differences in rank. Normalizing may refer to scaling of a measurement to eliminate dependency on a rank used to make the measurement.

The measurement report may also include additional information. For example, the measurement report may include a beam identifier, a cell identifier, and a frequency. The beam identifier may identify the directional beam 510 that was measured. The cell identifier may identify a cell of the base station 105 that transmitted the directional beam 510 that was measured. The frequency may indicate the frequency at which the directional beam 510 was transmitted.

At 440, the UE 115-*a* may transmit the measurement report to the base station 105-*a*. The base station 105-*a* may process the measurement report and determine what action, if any, to take. Operations 445 to 475 are shown in dashed lines of different types and correspond to different actions that may be taken based at least in part on the measurement report.

In an example, the base station 105-*a* may process the measurement report and determine not to make any change to the beam and subarray pair used to communicate with the UE 115-*a*. Based at least in part on this determination, the base station 105-*a* may, at 445, continue to communicate traffic with the UE 115-*a* using the same beam and subarray pair.

In another example, the base station 105-*a* may process the measurement report and determine to handover the UE 115-*a* to a different base station 105-*b*. For example, the base station 105-*a* may determine that a signal strength of a beam (such as beam 205-*e*) received at a particular subarray (such as subarray 315-*b*) of the UE 115-*a* from a second base station 105-*b* is better than a signal strength received by any beam and subarray pair combination used for communication with the base station 105-*a*. Based at least in part on this determination, the base station 105-*a* may, at 450, transmit a handover instruction to the UE 115-*a*, the base station 105-*b*, or both, to initiate a handover. The handover instruction may include a beam index and a subarray index corresponding to beam 205-*e* and subarray 315-*b* pair having the highest signal strength. The UE 115-*a* may perform the handover to the base station 105-*b*, and may, at 455, exchange traffic with the base station 105-*b* using the beam 205-*e* corresponding to the beam index and the subarray 315-*b* corresponding to the subarray index.

In a further example, the base station 105-*a* may process the measurement report and determine to perform a beam switch. For example, the base station 105-*a* may be communicating with the UE 115-*a* using a first directional beam 205-*a*. The base station 105-*a* may process the measurement report to determine a signal strength of a second directional beam 205-*b* is higher than the signal strength of the first directional beam 205-*a*. Based at least in part on this determination, the base station 105-*a* may, at 460, transmit a beam switch instruction to the UE 115-*a*. The beam switch instruction may include a beam index of the second directional beam 205-*b* and instruct the UE 115-*a* to communicate with the base station 105-*a* via the second directional beam 205-*b* instead of the first directional beam 205-*a*. The UE 115-*a* may perform the beam switch, and may, at 465, exchange traffic with the base station 105-*b* via the second directional beam 205-*b*.

In another example, the base station 105-*a* may process the measurement report and determine to perform a subarray switch. For example, the base station 105-*a* may be communicating with the UE 115-*a* using a first subarray 315-*a*. The base station 105-*a* may process the measurement report to determine a signal strength measured at a second subarray 315-*b* is higher than the signal strength measured at the first subarray 315-*a*. Based at least in part on this determination, the base station 105-*a* may, at 470, transmit a subarray switch instruction to the UE 115-*a*. The subarray switch instruction may include a subarray index of the second subarray 315-*b* and instruct the UE 115-*a* to communicate with the base station 105-*a* via the second subarray 315-*b* instead of the first subarray 315-*a*. The UE 115-*a* may perform the subarray switch, and may, at 465, exchange traffic with the base station 105-*b* via the second subarray 315-*b*.

The base station 105-*a* may also instruct the UE 115-*a* to perform both a beam switch and a subarray switch. For example, the base station 105-*a* may be communicating with the UE 115-*a* using a first subarray 315-*a* using a first directional beam 205-*a*. The base station 105-*a* may process the measurement report to determine a signal strength of a second directional beam 205-*b* measured at a second subarray 315-*b* is higher than the signal strength of the first directional beam 205-*a* measured at the first subarray 315-*a*. Based at least in part on this determination, the base station 105-*a* may, at 470, transmit a switch instruction to the UE 115-*a*. The switch instruction may include a subarray index of the second subarray 315-*b* and a beam index of the second beam 205-*b*, and instruct the UE 115-*a* to communicate with the base station 105-*a* via the second subarray 315-*b* and the second directional beam 205-*b*. The UE 115-*a* may perform the switch, and may exchange traffic with the base station 105-*b* via the second subarray 315-*b* and the second directional beam 205-*b*.

Advantageously, the UE 115-*a* and base station 105-*a* may coordinate to identify a suitable beam and subarray pair for communication.

Figure 6:
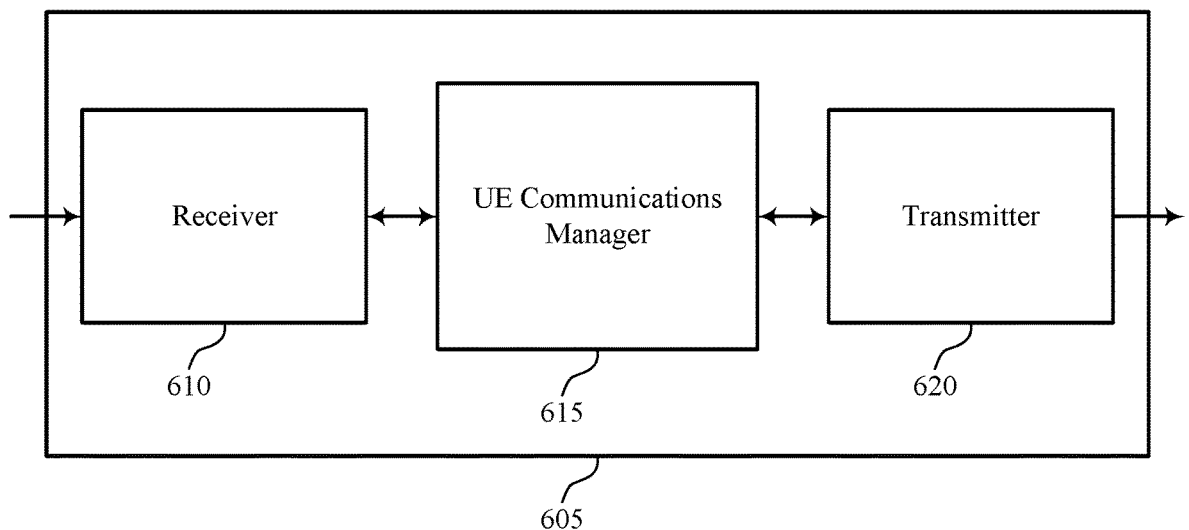
FIGS. 6 through 8 show block diagrams of a device that supports reference signal measurement and reporting for new radio (NR) systems in accordance with aspects of the present disclosure.

FIG. 6 shows a block diagram 600 of a wireless device 605 that supports reference signal measurement and reporting for new radio (NR) systems in accordance with aspects of the present disclosure. Wireless device 605 may be an example of aspects of a user equipment (UE) 115 as described with reference to FIG. 1. wireless device 605 may include receiver 610, UE communications manager 615, and transmitter 620. wireless device 605 also may include a processor. Each of these components may be in communication with one another (such as via one or more buses).

Receiver 610 may receive information such as packets, user data, or control information associated with various information channels (such as control channels, data channels, and information related to reference signal measurement and reporting for new radio (NR) systems, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615, at least some of its various sub-components, or both, may be implemented in hardware, software executed by a processor, firmware, or any combination thereof. If implemented in software executed by a processor, the functions of the UE communications manager 615, at least some of its various sub-components, or both, may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615, at least some of its various sub-components, or both, may be physically located at various positions, including being distributed such that portions of functions are implemented at different physical locations by one or more physical devices. In some examples, UE communications manager 615, at least some of its various sub-components, or both, may be a separate and distinct component in accordance with various aspects of the present disclosure. In other examples, UE communications manager 615, at least some of its various sub-components, or both, may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may measure, based on a rank supported by a UE, a reference signal to generate a measurement using a first subarray of a set of subarrays of an antenna array of the UE, generate a measurement report, specific to the rank supported by the UE and the first subarray, that indicates the measurement, and transmit the measurement report to a base station.

UE communications manager 615 may receive a measurement gap configuration from a base station specifying a measurement gap type of a set of different measurement gap types, measure, in a measurement gap corresponding to the specified measurement gap type, a reference signal to generate a measurement using a first subarray of a set of subarrays of an antenna array of a UE, generate a measurement report that indicates the measurement, and transmit the measurement report to a base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
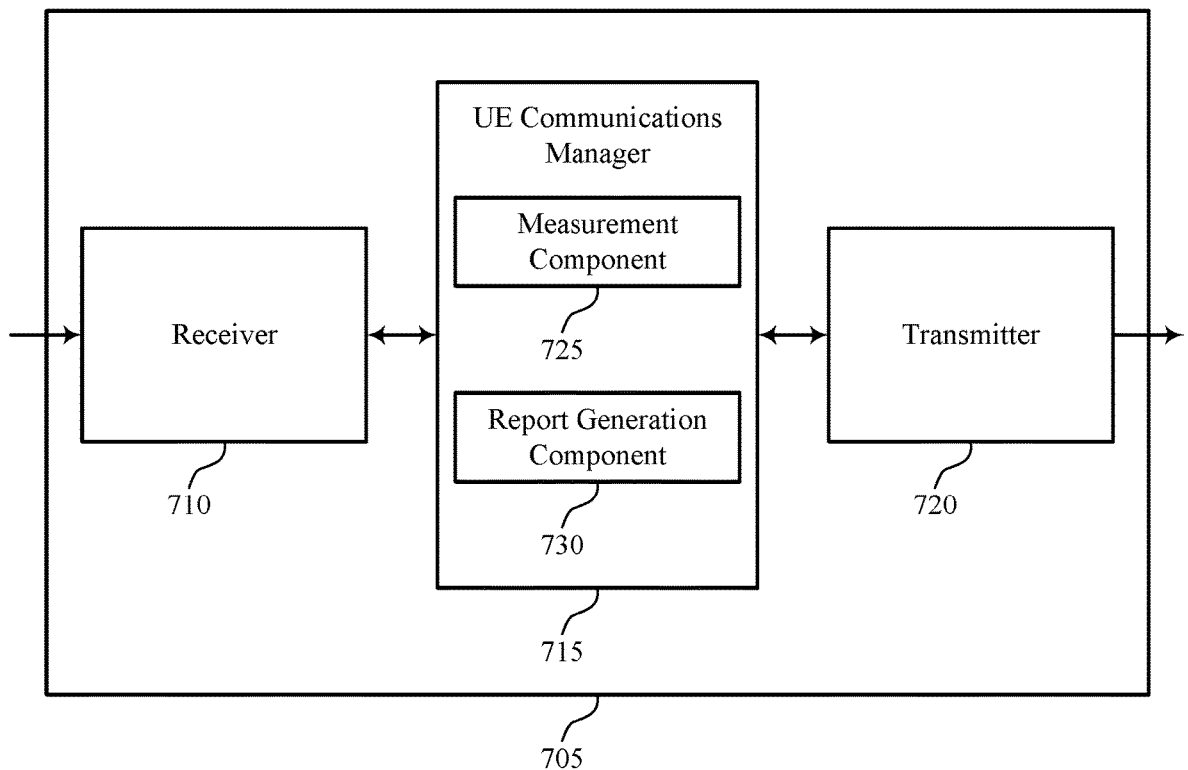

FIG. 7 shows a block diagram 700 of a wireless device 705 that supports reference signal measurement and reporting for new radio (NR) systems in accordance with aspects of the present disclosure. Wireless device 705 may be an example of aspects of a wireless device 605 or a UE 115 as described with reference to FIGS. 1 and 6. wireless device 705 may include receiver 710, UE communications manager 715, and transmitter 720. wireless device 705 also may include a processor. Each of these components may be in communication with one another (such as via one or more buses).

Receiver 710 may receive information such as packets, user data, or control information associated with various information channels (such as control channels, data channels, and information related to reference signal measurement and reporting for new radio (NR) systems, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 also may include measurement component 725 and report generation component 730.

Measurement component 725 may measure, based on a rank supported by a UE, a reference signal to generate a measurement using a first subarray of a set of subarrays of an antenna array of the UE. In some cases, measurement component 725 may measure a first symbol of the reference signal during a first time interval of the set of time intervals using a second subarray of the set of subarrays, where measuring the reference signal using the first subarray includes measuring a second symbol of the reference signal during the first time interval. In some cases, measuring the reference signal using the first subarray further includes: determining an average of the measurement over time. In some cases, measuring the reference signal using the first subarray includes measuring the reference signal during an autonomous gap.

In some cases, measurement component 725 may measure the reference signal during a first time interval of the set of time intervals using a second subarray of the set of subarrays, where measuring the reference signal using the first subarray occurs during a second time interval of the set of time intervals. In some cases, measurement component 725 may measure the reference signal using a second subarray of the set of subarrays to generate a second measurement, where the measurement report includes the second measurement.

Report generation component 730 may generate a measurement report, specific to the rank supported by the UE and the first subarray, that indicates the measurement and transmit the measurement report to a base station. In some cases, the measurement report identifies the supported rank and includes an index of the first subarray.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
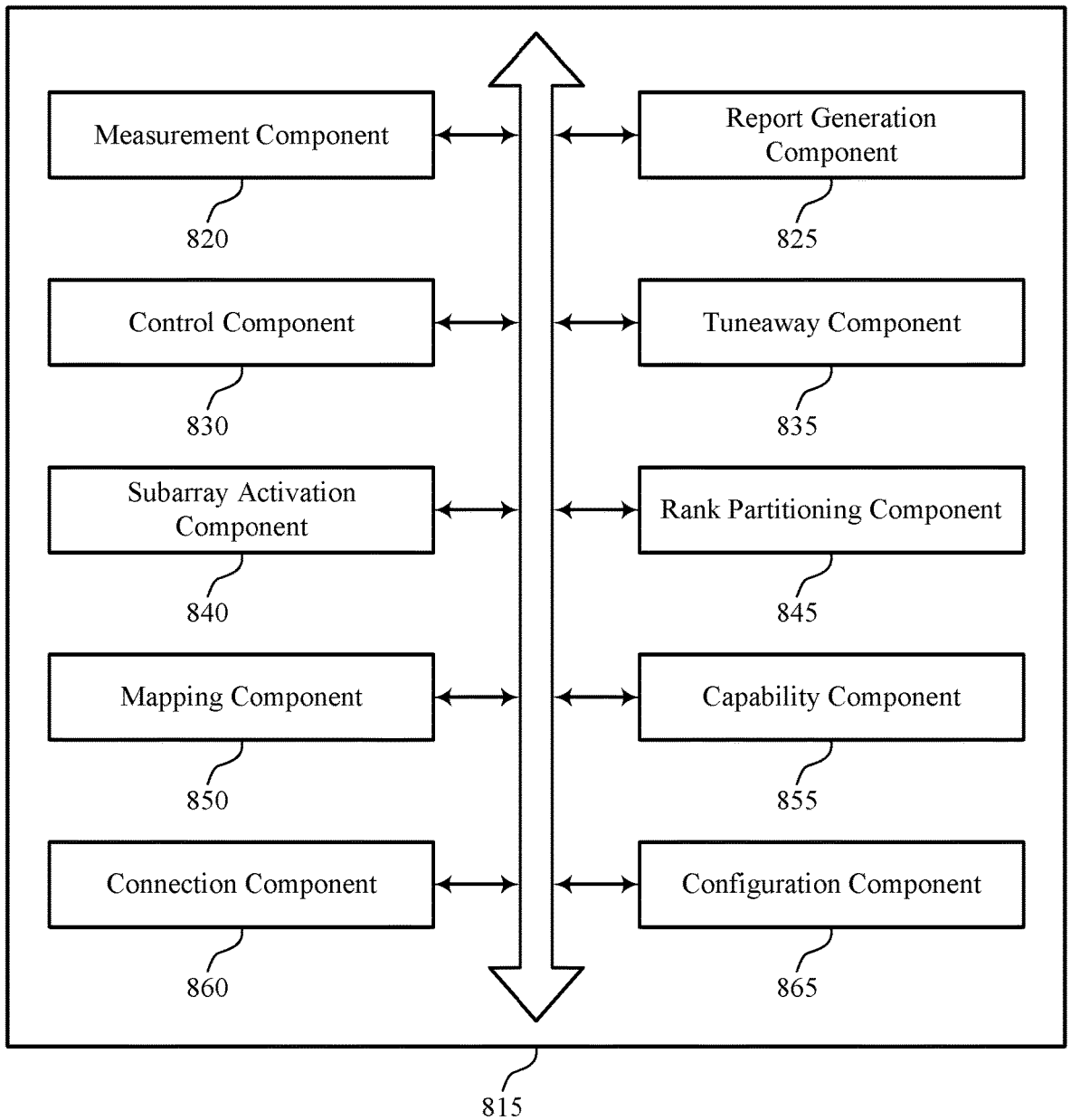

FIG. 8 shows a block diagram 800 of a UE communications manager 815 that supports reference signal measurement and reporting for new radio (NR) systems in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include measurement component 820, report generation component 825, control component 830, tuneaway component 835, subarray activation component 840, rank partitioning component 845, mapping component 850, capability component 855, connection component 860, and configuration component 865. Each of these modules may communicate, directly or indirectly, with one another (such as via one or more buses).

Measurement component 820 may measure, based on a rank supported by a UE, a reference signal to generate a measurement using a first subarray of a set of subarrays of an antenna array of the UE, measure the reference signal during a first time interval of the set of time intervals using a second subarray of the set of subarrays, where measuring the reference signal using the first subarray occurs during a second time interval of the set of time intervals, and measure the reference signal using a second subarray of the set of subarrays to generate a second measurement, where the measurement report includes the second measurement. In some cases, measuring a first symbol of the reference signal during a first time interval of the set of time intervals using a second subarray of the set of subarrays, where measuring the reference signal using the first subarray includes: measuring a second symbol of the reference signal during the first time interval. In some cases, measuring the reference signal using the first subarray further includes: determining an average of the measurement over time. In some cases, the measurement report identifies the supported rank and includes an index of the first subarray. In some cases, measuring the reference signal using the first subarray includes measuring the reference signal during an autonomous gap.

Report generation component 825 may generate a measurement report, specific to the rank supported by the UE and the first subarray, that indicates the measurement and transmit the measurement report to a base station.

Control component 830 may receive control signaling from the base station and process the control signaling to determine a set of time intervals over which the reference signal is transmitted.

Tuneaway component 835 may tune away from a first frequency to a second frequency, where measuring the reference signal using the first subarray occurs while tuned to the second frequency and tune away from a first frequency to a second frequency.

Subarray activation component 840 may deactivate a second subarray of the set of subarrays, activate the first subarray, where measuring the reference signal using the first subarray occurs while tuned to the second frequency, and select which of the set of subarrays to use to communicate with the base station based on the measurement.

Rank partitioning component 845 may determine a partition of the rank supported by the UE to be used for measuring the reference signal.

Mapping component 850 may map, based on the rank partition, a first RF chain of the UE to the first subarray and a second RF chain of the UE to the first subarray or a second subarray of the set of subarrays, where measuring the reference signal using the first subarray occurs on the first RF chain while the second RF chain simultaneously communicates via the first subarray or the second subarray.

Capability component 855 may transmit capability information of the UE to the base station. In some cases, the capability information indicates whether the UE supports measurements during measurement gaps, or whether the UE supports measurements during symbol gaps, or whether the UE supports autonomous gaps, or whether partitioning of the rank simultaneously supports communication and measurement of the reference signal, or any combination thereof.

Connection component 860 may establish a connection to the base station using the first subarray or a second subarray of the set of subarrays.

Configuration component 865 may receive a measurement gap configuration from the base station. In some cases, the measurement gap configuration instructs the UE to perform an inter-frequency measurement, or perform an intra-frequency measurement, or perform an inter-cell measurement, or perform a sweep through each of the set of subarrays, or select what type of measurement to make, or any combination thereof. In some cases, the measurement gap configuration specifies a periodicity and pattern of the measurement gap. In some cases, measuring the reference signal is performed in a measurement gap specified in the measurement gap configuration.

Figure 9:
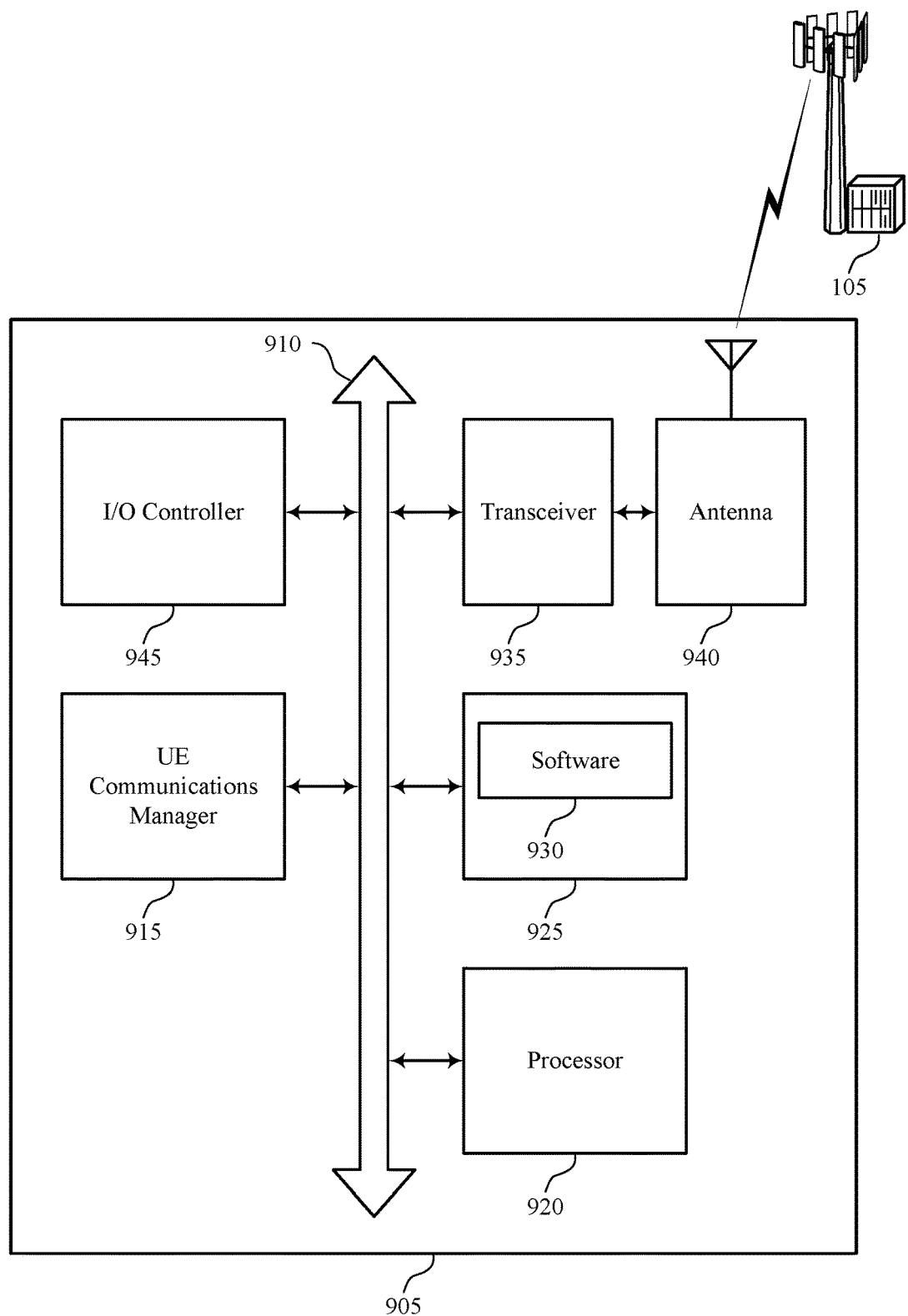
FIG. 9 illustrates a block diagram of a system including a UE that supports reference signal measurement and reporting for new radio (NR) systems in accordance with aspects of the present disclosure.

FIG. 9 shows a diagram of a system 900 including a device 905 that supports reference signal measurement and reporting for new radio (NR) systems in accordance with aspects of the present disclosure. Device 905 may be an example of or include the components of wireless device 605, wireless device 705, or a UE 115 as described above, such as with reference to FIGS. 1, 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more busses (such as bus 910). Device 905 may communicate wirelessly with one or more base stations 105.

Processor 920 may include an intelligent hardware device, (such as a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (such as functions or tasks supporting reference signal measurement and reporting for new radio (NR) systems).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware operation, software operation, or both, such as the interaction with peripheral components or devices.

Software 930 may include code to implement aspects of the present disclosure, including code to support reference signal measurement and reporting for new radio (NR) systems. Software 930 may be stored in a non-transitory computer-readable medium such as system memory or other memory. In some cases, the software 930 may not be directly executable by the processor but may cause a computer (such as when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 also may include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 also may manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
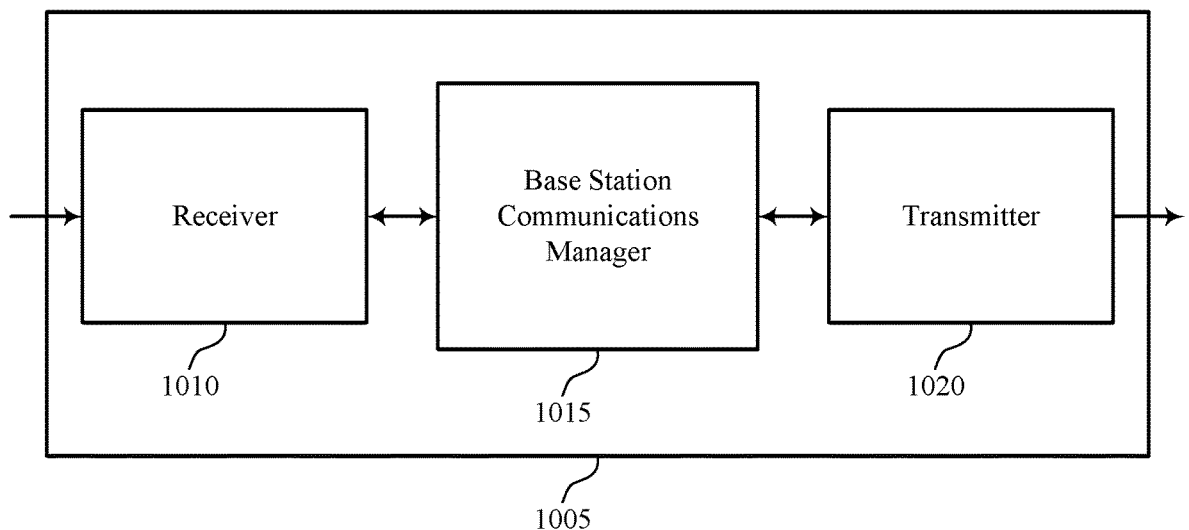
FIGS. 10 through 12 show block diagrams of a device that supports reference signal measurement and reporting for new radio (NR) systems in accordance with aspects of the present disclosure.

FIG. 10 shows a block diagram 1000 of a wireless device 1005 that supports reference signal measurement and reporting for new radio (NR) systems in accordance with aspects of the present disclosure. Wireless device 1005 may be an example of aspects of a base station 105 as described with reference to FIG. 1. wireless device 1005 may include receiver 1010, base station communications manager 1015, and transmitter 1020. wireless device 1005 also may include a processor. Each of these components may be in communication with one another (such as via one or more buses).

Receiver 1010 may receive information such as packets, user data, or control information associated with various information channels (such as control channels, data channels, and information related to reference signal measurement and reporting for new radio (NR) systems, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015, at least some of its various sub-components, or both, may be implemented in hardware, software executed by a processor, firmware, or any combination thereof. If implemented in software executed by a processor, the functions of the base station communications manager 1015, at least some of its various sub-components, or both, may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015, at least some of its various sub-components, or both, may be physically located at various positions, including being distributed such that portions of functions are implemented at different physical locations by one or more physical devices. In some examples, base station communications manager 1015, at least some of its various sub-components, or both, may be a separate and distinct component in accordance with various aspects of the present disclosure. In other examples, base station communications manager 1015, at least some of its various sub-components, or both, may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may receive, from a UE including an antenna array that includes a set of subarrays, a measurement report having an indication of a reference signal measurement corresponding to a first subarray of the set of subarrays and a supported rank of the UE, select a particular subarray of the set of subarrays based on the indication of the reference signal measurement, and transmit an instruction to the UE to use the particular subarray for communication with a base station.

Base station communications manager 1015 may transmit, to a UE including an antenna array that includes a set of subarrays, a measurement gap configuration specifying a measurement gap type of a set of different measurement gap types, receive, from the UE, a measurement report having an indication of a reference signal measurement measured within a measurement gap corresponding to the specified measurement gap type using a first subarray of the set of subarrays of the UE, select a particular subarray of the set of subarrays based on the indication of the reference signal measurement, and transmit an instruction to the UE to use the particular subarray for communication with a base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
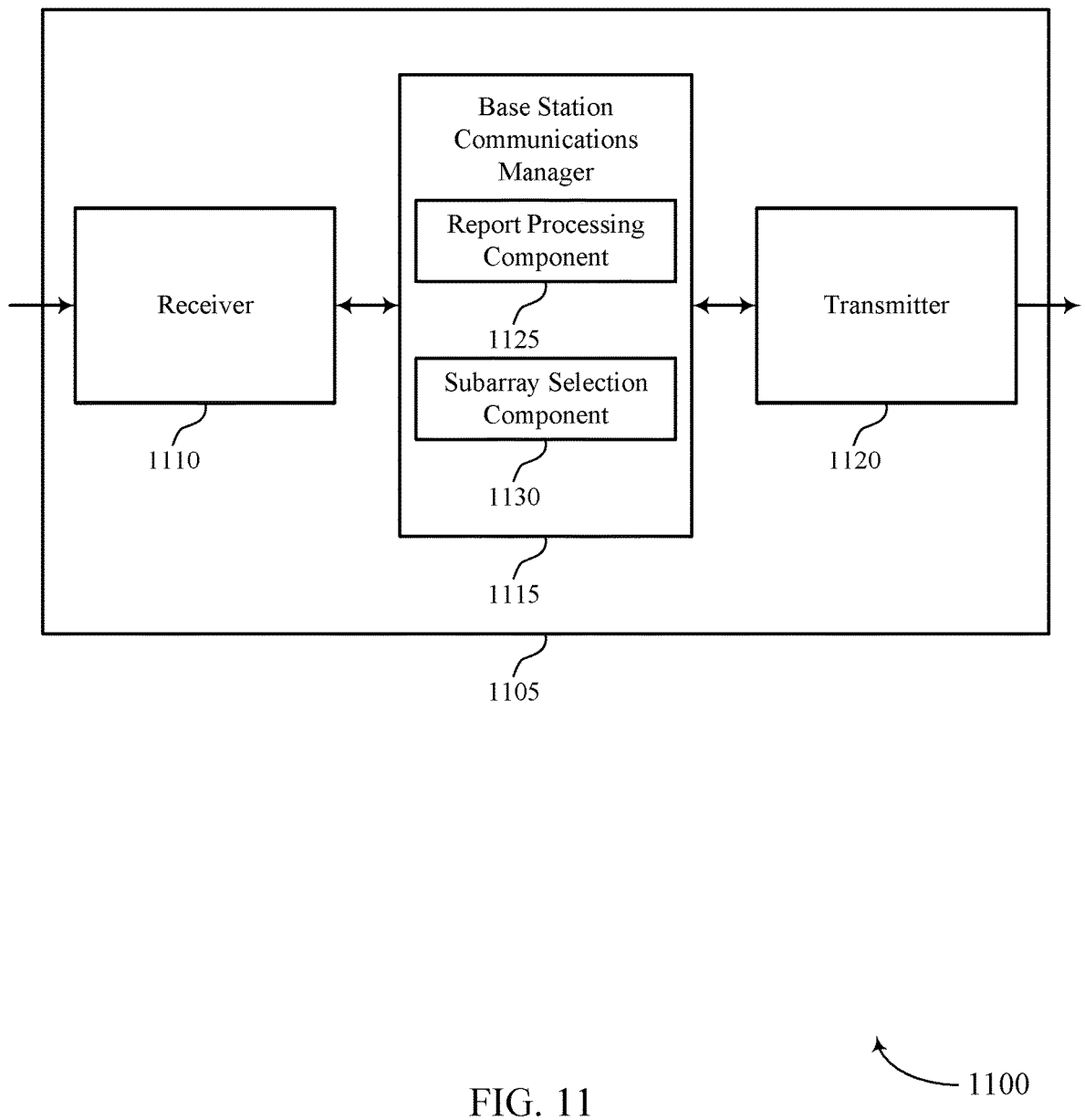

FIG. 11 shows a block diagram 1100 of a wireless device 1105 that supports reference signal measurement and reporting for new radio (NR) systems in accordance with aspects of the present disclosure. Wireless device 1105 may be an example of aspects of a wireless device 1005 or a base station 105 as described with reference to FIGS. 1 and 10. wireless device 1105 may include receiver 1110, base station communications manager 1115, and transmitter 1120. wireless device 1105 also may include a processor. Each of these components may be in communication with one another (such as via one or more buses).

Receiver 1110 may receive information such as packets, user data, or control information associated with various information channels (such as control channels, data channels, and information related to reference signal measurement and reporting for new radio (NR) systems, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 also may include report processing component 1125 and subarray selection component 1130.

Report processing component 1125 may receive, from a UE including an antenna array that includes a set of subarrays, a measurement report having an indication of a reference signal measurement corresponding to a first subarray of the set of subarrays and a supported rank of the UE.

Subarray selection component 1130 may select a particular subarray of the set of subarrays based on the indication of the reference signal measurement and transmit an instruction to the UE to use the particular subarray for communication with a base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
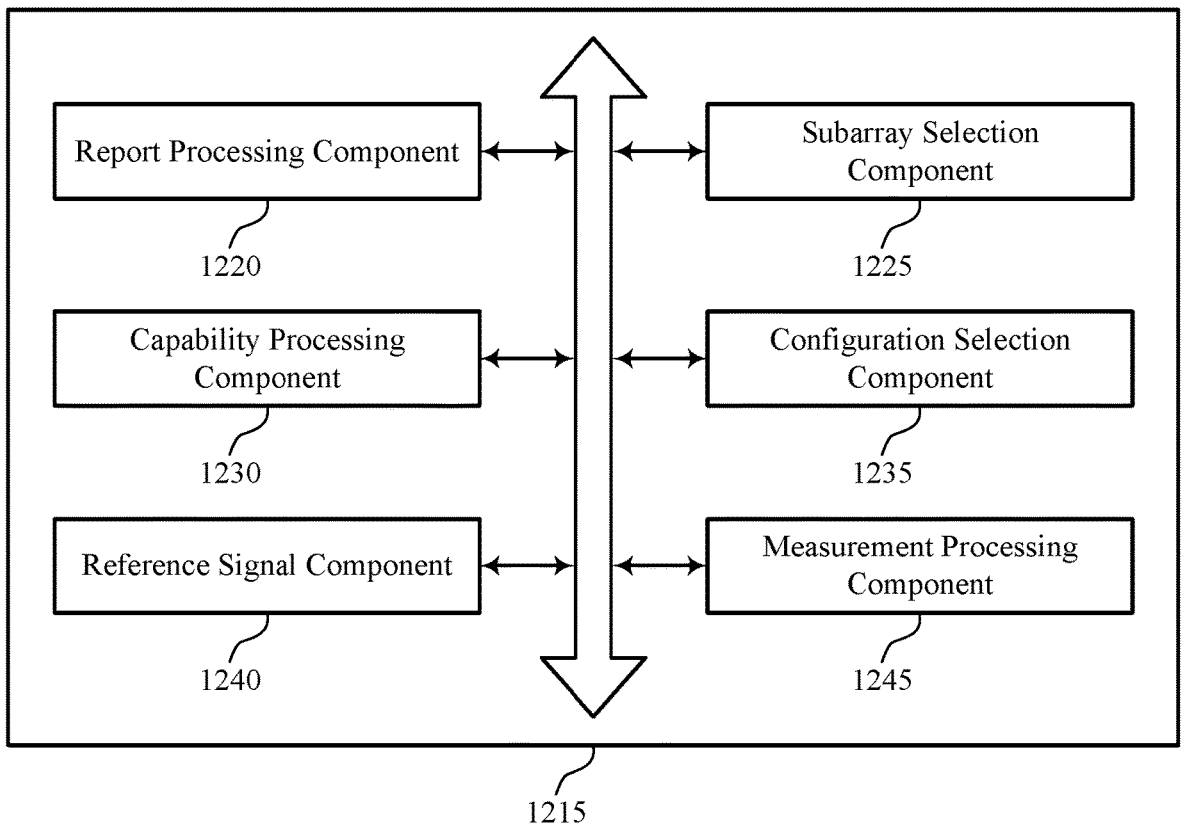

FIG. 12 shows a block diagram 1200 of a base station communications manager 1215 that supports reference signal measurement and reporting for new radio (NR) systems in accordance with aspects of the present disclosure. The base station communications manager 1215 may be an example of aspects of a base station communications manager 1315 described with reference to FIGS. 10, 11, and 13. The base station communications manager 1215 may include report processing component 1220, subarray selection component 1225, capability processing component 1230, configuration selection component 1235, reference signal component 1240, and measurement processing component 1245. Each of these modules may communicate, directly or indirectly, with one another (such as via one or more buses).

Report processing component 1220 may receive, from a UE including an antenna array that includes a set of subarrays, a measurement report having an indication of a reference signal measurement corresponding to a first subarray of the set of subarrays and a supported rank of the UE.

Subarray selection component 1225 may select a particular subarray of the set of subarrays based on the indication of the reference signal measurement and transmit an instruction to the UE to use the particular subarray for communication with a base station.

Capability processing component 1230 may receive capability information of the UE. In some cases, the capability information indicates whether the UE supports measurements during measurement gaps, or whether the UE supports measurements during symbol gaps, or whether the UE supports autonomous gaps, or whether the UE supports simultaneous communication and measurement of a reference signal, or any combination thereof.

Configuration selection component 1235 may select a measurement gap configuration for the UE based on the capability information.

Reference signal component 1240 may transmit a reference signal based on the measurement gap configuration and transmit the reference signal as multiple directional beams in respective time subintervals of a set of time intervals.

Measurement processing component 1245 may normalize the reference signal measurement relative to a second reference signal measurement of a second subarray of the set of subarrays based on the supported rank.

Figure 13:
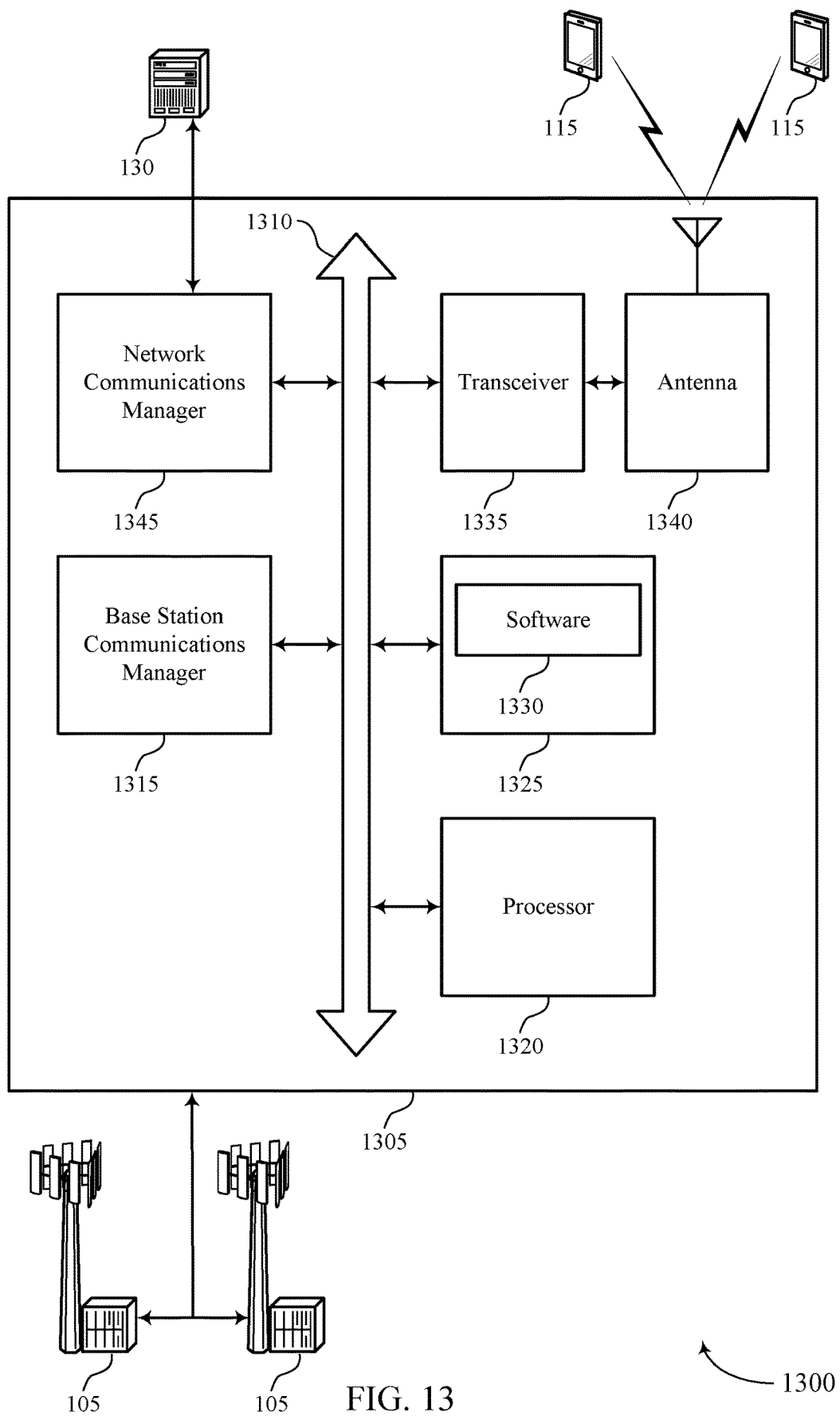
FIG. 13 illustrates a block diagram of a system including a base station that supports reference signal measurement and reporting for new radio (NR) systems in accordance with aspects of the present disclosure.

FIG. 13 shows a diagram of a system 1300 including a device 1305 that supports reference signal measurement and reporting for new radio (NR) systems in accordance with aspects of the present disclosure. Device 1305 may be an example of or include the components of base station 105 as described above, such as with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more busses (such as bus 1310). Device 1305 may communicate wirelessly with one or more UEs 115.

Processor 1320 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (such as functions or tasks supporting reference signal measurement and reporting for new radio (NR) systems).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware operation, software operation, or both, such as the interaction with peripheral components or devices.

Software 1330 may include code to implement aspects of the present disclosure, including code to support reference signal measurement and reporting for new radio (NR) systems. Software 1330 may be stored in a non-transitory computer-readable medium such as system memory or other memory. In some cases, the software 1330 may not be directly executable by the processor but may cause a computer (such as when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 also may include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (such as via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an Long Term Evolution (LTE)/LTE-A wireless communication network technology to provide communication between base stations 105.

Figure 14:
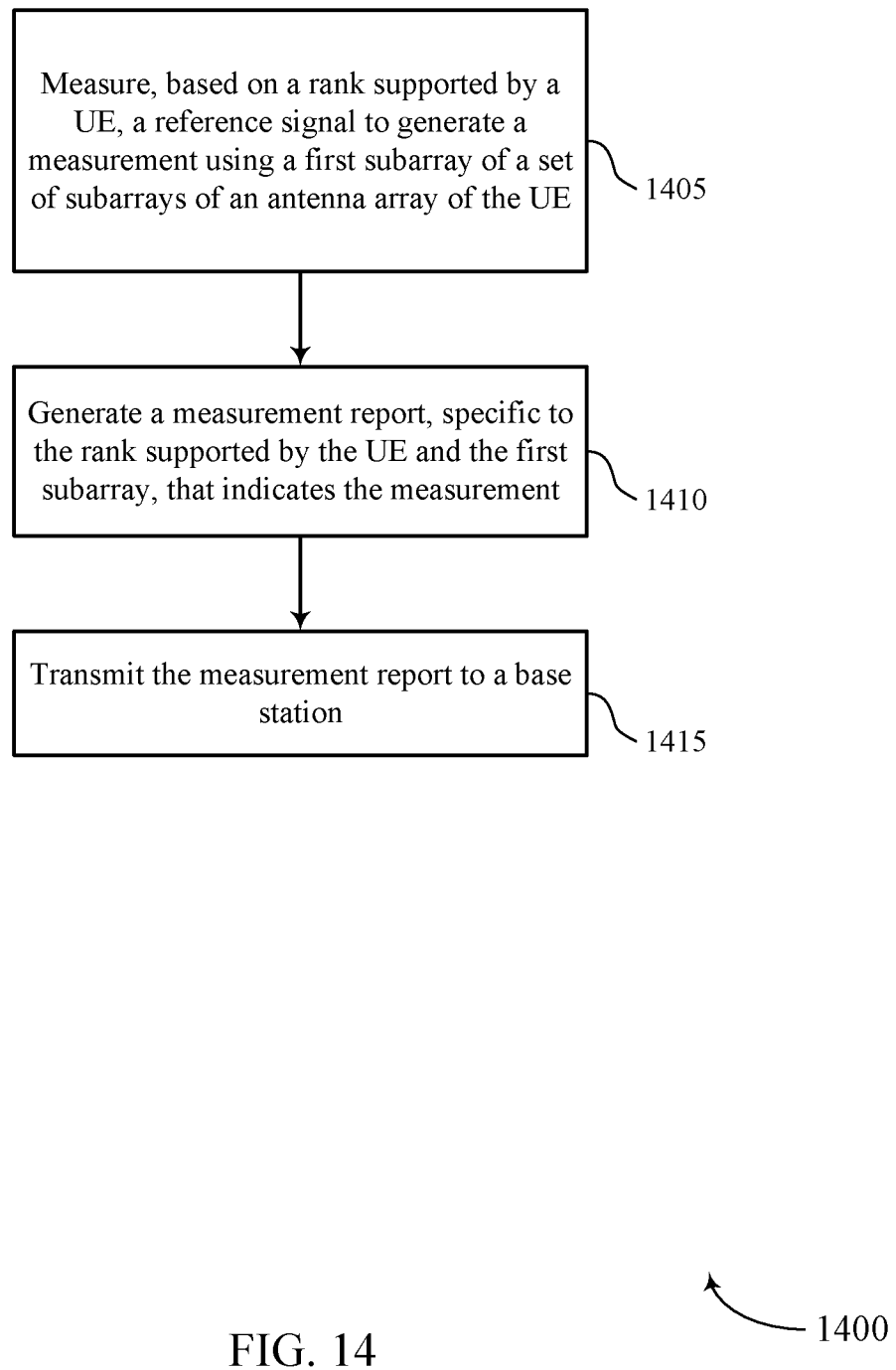
FIGS. 14 through 21 illustrate methods for reference signal measurement and reporting for new radio (NR) systems in accordance with aspects of the present disclosure.

FIG. 14 shows a flowchart illustrating a method 1400 for reference signal measurement and reporting for new radio (NR) systems in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may measure, based at least in part on a rank supported by a user equipment (UE), a reference signal to generate a measurement using a first subarray of a plurality of subarrays of an antenna array of the UE. The operations of block 1405 may be performed according to the methods described with reference to FIGS. 1 through 4. In certain examples, aspects of the operations of block 1405 may be performed by a measurement component as described with reference to FIGS. 6 through 9.

At block 1410 the UE 115 may generate a measurement report, specific to the rank supported by the UE and the first subarray, that indicates the measurement. The operations of block 1410 may be performed according to the methods described with reference to FIGS. 1 through 4. In certain examples, aspects of the operations of block 1410 may be performed by a report generation component as described with reference to FIGS. 6 through 9.

At block 1415 the UE 115 may transmit the measurement report to a base station. The operations of block 1415 may be performed according to the methods described with reference to FIGS. 1 through 4. In certain examples, aspects of the operations of block 1415 may be performed by a report generation component as described with reference to FIGS. 6 through 9.

Figure 15:
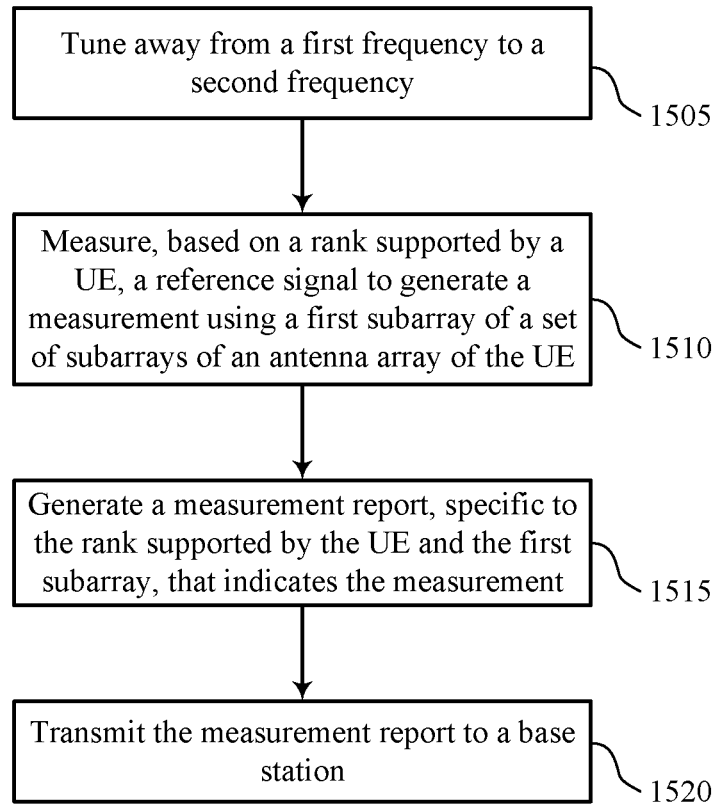

FIG. 15 shows a flowchart illustrating a method 1500 for reference signal measurement and reporting for new radio (NR) systems in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may tune away from a first frequency to a second frequency. The operations of block 1505 may be performed according to the methods described with reference to FIGS. 1 through 4. In certain examples, aspects of the operations of block 1505 may be performed by a tuneaway component as described with reference to FIGS. 6 through 9.

At block 1510 the UE 115 may measure, based on a rank supported by a UE, a reference signal to generate a measurement using a first subarray of a set of subarrays of an antenna array of the UE, where measuring the reference signal using the first subarray occurs while tuned to the second frequency. The operations of block 1510 may be performed according to the methods described with reference to FIGS. 1 through 4. In certain examples, aspects of the operations of block 1510 may be performed by a measurement component as described with reference to FIGS. 6 through 9.

At block 1515 the UE 115 may generate a measurement report, specific to the rank supported by the UE and the first subarray, that indicates the measurement. The operations of block 1515 may be performed according to the methods described with reference to FIGS. 1 through 4. In certain examples, aspects of the operations of block 1515 may be performed by a report generation component as described with reference to FIGS. 6 through 9.

At block 1520 the UE 115 may transmit the measurement report to a base station. The operations of block 1520 may be performed according to the methods described with reference to FIGS. 1 through 4. In certain examples, aspects of the operations of block 1520 may be performed by a report generation component as described with reference to FIGS. 6 through 9.

Figure 16:
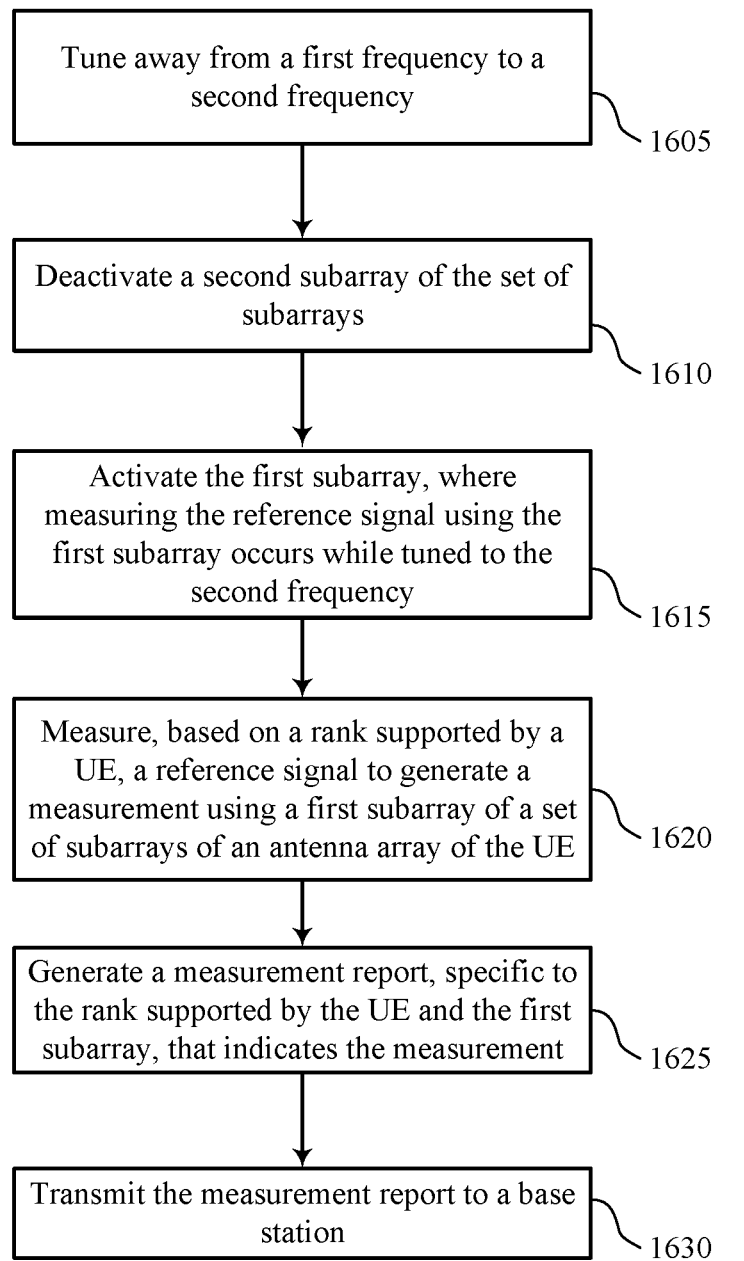

FIG. 16 shows a flowchart illustrating a method 1600 for reference signal measurement and reporting for new radio (NR) systems in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may tune away from a first frequency to a second frequency. The operations of block 1605 may be performed according to the methods described with reference to FIGS. 1 through 4. In certain examples, aspects of the operations of block 1605 may be performed by a tuneaway component as described with reference to FIGS. 6 through 9.

At block 1610 the UE 115 may deactivate a second subarray of the plurality of subarrays. The operations of block 1610 may be performed according to the methods described with reference to FIGS. 1 through 4. In certain examples, aspects of the operations of block 1610 may be performed by a subarray activation component as described with reference to FIGS. 6 through 9.

At block 1615 the UE 115 may activate the first subarray, wherein measuring the reference signal using the first subarray occurs while tuned to the second frequency. The operations of block 1615 may be performed according to the methods described with reference to FIGS. 1 through 4. In certain examples, aspects of the operations of block 1615 may be performed by a subarray activation component as described with reference to FIGS. 6 through 9.

At block 1620 the UE 115 measure, based at least in part on a rank supported by a user equipment (UE), a reference signal to generate a measurement using a first subarray of a plurality of subarrays of an antenna array of the UE. The operations of block 1620 may be performed according to the methods described with reference to FIGS. 1 through 4. In certain examples, aspects of the operations of block 1620 may be performed by a measurement component as described with reference to FIGS. 6 through 9.

At block 1625 the UE 115 may generate a measurement report, specific to the rank supported by the UE and the first subarray, that indicates the measurement. The operations of block 1625 may be performed according to the methods described with reference to FIGS. 1 through 4. In certain examples, aspects of the operations of block 1625 may be performed by a report generation component as described with reference to FIGS. 6 through 9.

At block 1630 the UE 115 may transmit the measurement report to a base station. The operations of block 1630 may be performed according to the methods described with reference to FIGS. 1 through 4. In certain examples, aspects of the operations of block 1630 may be performed by a report generation component as described with reference to FIGS. 6 through 9.

Figure 17:
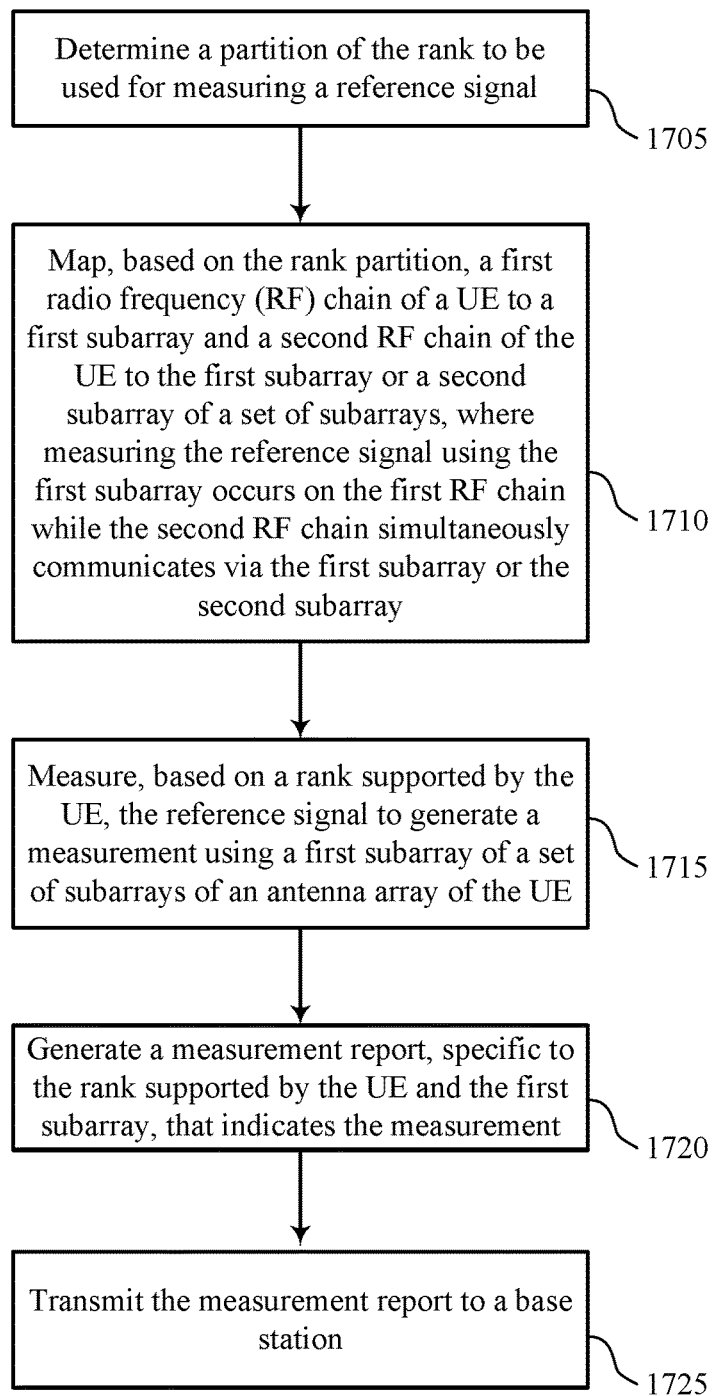

FIG. 17 shows a flowchart illustrating a method 1700 for reference signal measurement and reporting for new radio (NR) systems in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may determine a partition of the rank to be used for measuring a reference signal. The operations of block 1705 may be performed according to the methods described with reference to FIGS. 1 through 4. In certain examples, aspects of the operations of block 1705 may be performed by a rank partitioning component as described with reference to FIGS. 6 through 9.

At block 1710 the UE 115 may map, based at least in part on the rank partition, a first RF chain of the UE 115 to the first subarray and a second RF chain of the UE 115 to the first subarray or a second subarray of the plurality of subarrays, wherein measuring the reference signal using the first subarray occurs on the first RF chain while the second RF chain simultaneously communicates via the first subarray or the second subarray. The operations of block 1710 may be performed according to the methods described with reference to FIGS. 1 through 4. In certain examples, aspects of the operations of block 1710 may be performed by a mapping component as described with reference to FIGS. 6 through 9.

At block 1715 the UE 115 may measure, based at least in part on a rank supported by the UE 115, a reference signal to generate a measurement using a first subarray of a plurality of subarrays of an antenna array of the UE 115. The operations of block 1715 may be performed according to the methods described with reference to FIGS. 1 through 4. In certain examples, aspects of the operations of block 1715 may be performed by a measurement component as described with reference to FIGS. 6 through 9.

At block 1720 the UE 115 may generate a measurement report, specific to the rank supported by the UE 115 and the first subarray, that indicates the measurement. The operations of block 1720 may be performed according to the methods described with reference to FIGS. 1 through 4. In certain examples, aspects of the operations of block 1720 may be performed by a report generation component as described with reference to FIGS. 6 through 9.

At block 1725 the UE 115 may transmit the measurement report to a base station. The operations of block 1725 may be performed according to the methods described with reference to FIGS. 1 through 4. In certain examples, aspects of the operations of block 1725 may be performed by a report generation component as described with reference to FIGS. 6 through 9.

Figure 18:
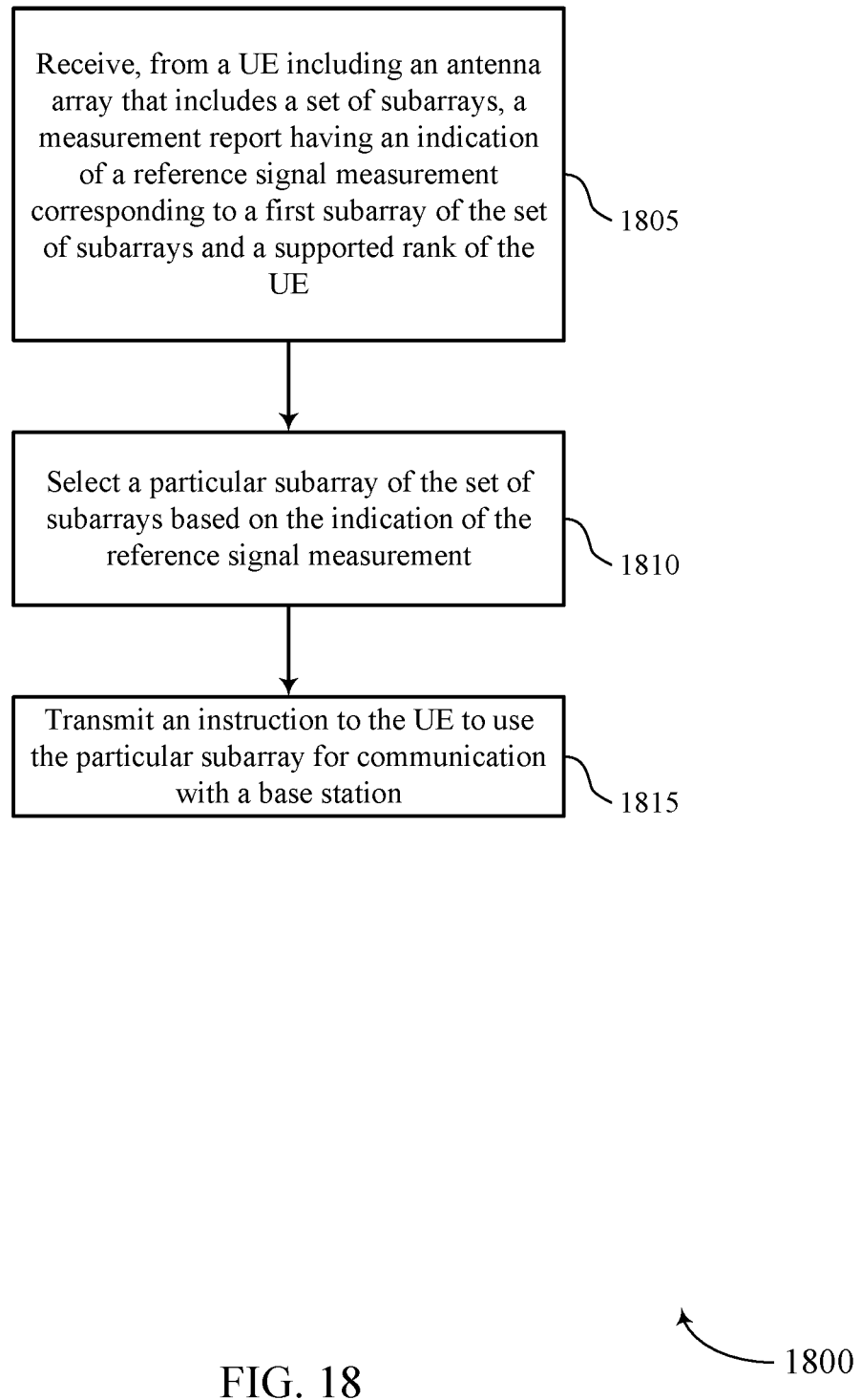

FIG. 18 shows a flowchart illustrating a method 1800 for reference signal measurement and reporting for new radio (NR) systems in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive, from a user equipment (UE) comprising an antenna array that includes a plurality of subarrays, a measurement report having an indication of a reference signal measurement corresponding to a first subarray of the plurality of subarrays and a supported rank of the UE. The operations of block 1805 may be performed according to the methods described with reference to FIGS. 1 through 4. In certain examples, aspects of the operations of block 1805 may be performed by a report processing component as described with reference to FIGS. 10 through 13.

At block 1810 the base station 105 may select a particular subarray of the plurality of subarrays based at least in part on the indication of the reference signal measurement. The operations of block 1810 may be performed according to the methods described with reference to FIGS. 1 through 4. In certain examples, aspects of the operations of block 1810 may be performed by a subarray selection component as described with reference to FIGS. 10 through 13.

At block 1815 the base station 105 may transmit an instruction to the UE to use the particular subarray for communication with a base station. The operations of block 1815 may be performed according to the methods described with reference to FIGS. 1 through 4. In certain examples, aspects of the operations of block 1815 may be performed by a subarray selection component as described with reference to FIGS. 10 through 13.

Figure 19:
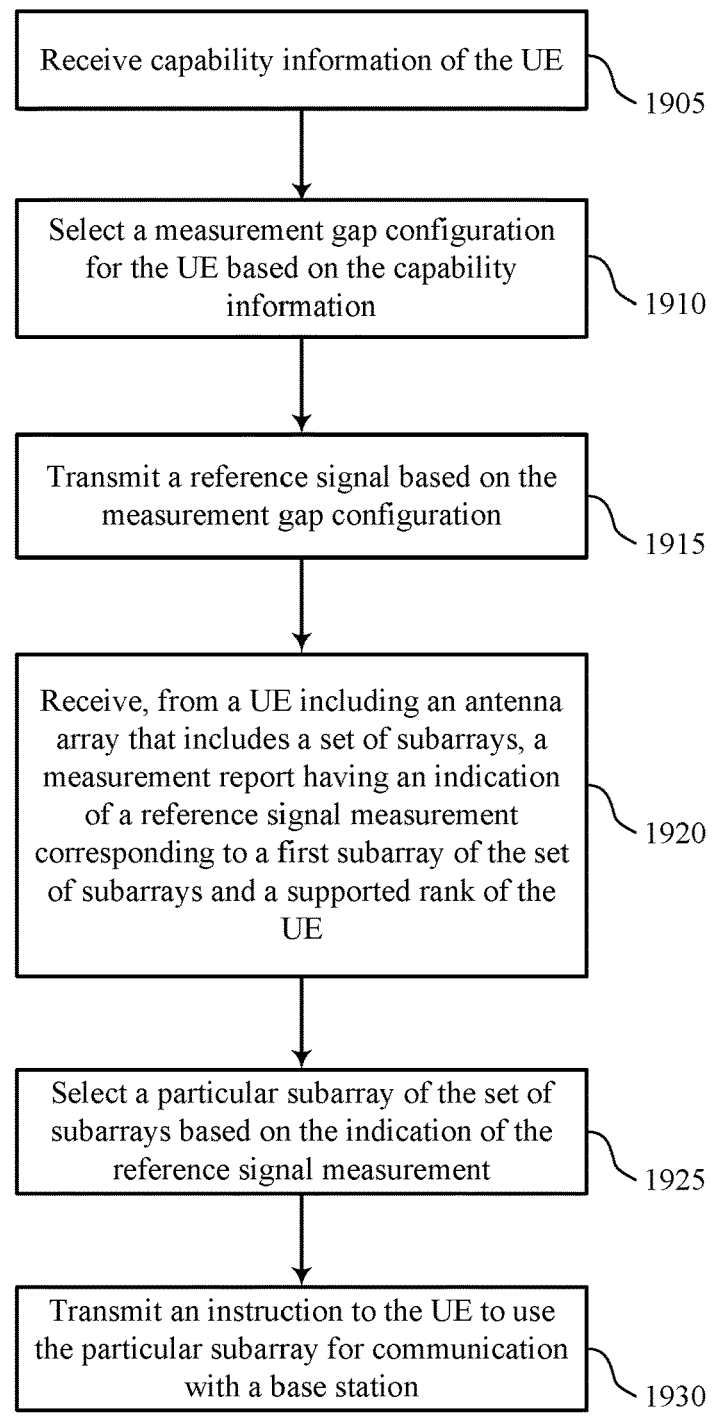

FIG. 19 shows a flowchart illustrating a method 1900 for reference signal measurement and reporting for new radio (NR) systems in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive capability information of the UE. The operations of block 1905 may be performed according to the methods described with reference to FIGS. 1 through 4. In certain examples, aspects of the operations of block 1905 may be performed by a capability processing component as described with reference to FIGS. 10 through 13.

At block 1910 the base station 105 may select a measurement gap configuration for the UE based at least in part on the capability information. The operations of block 1910 may be performed according to the methods described with reference to FIGS. 1 through 4. In certain examples, aspects of the operations of block 1910 may be performed by a configuration selection component as described with reference to FIGS. 10 through 13.

At block 1915 the base station 105 may transmit a reference signal based at least in part on the measurement gap configuration. The operations of block 1915 may be performed according to the methods described with reference to FIGS. 1 through 4. In certain examples, aspects of the operations of block 1915 may be performed by a reference signal component as described with reference to FIGS. 10 through 13.

At block 1920 the base station 105 may receive, from a user equipment (UE) comprising an antenna array that includes a plurality of subarrays, a measurement report having an indication of a reference signal measurement corresponding to a first subarray of the plurality of subarrays and a supported rank of the UE. The operations of block 1920 may be performed according to the methods described with reference to FIGS. 1 through 4. In certain examples, aspects of the operations of block 1920 may be performed by a report processing component as described with reference to FIGS. 10 through 13.

At block 1925 the base station 105 may select a particular subarray of the plurality of subarrays based at least in part on the indication of the reference signal measurement. The operations of block 1925 may be performed according to the methods described with reference to FIGS. 1 through 4. In certain examples, aspects of the operations of block 1925 may be performed by a subarray selection component as described with reference to FIGS. 10 through 13.

At block 1930 the base station 105 may transmit an instruction to the UE to use the particular subarray for communication with a base station. The operations of block 1930 may be performed according to the methods described with reference to FIGS. 1 through 4. In certain examples, aspects of the operations of block 1930 may be performed by a subarray selection component as described with reference to FIGS. 10 through 13.

Figure 20:
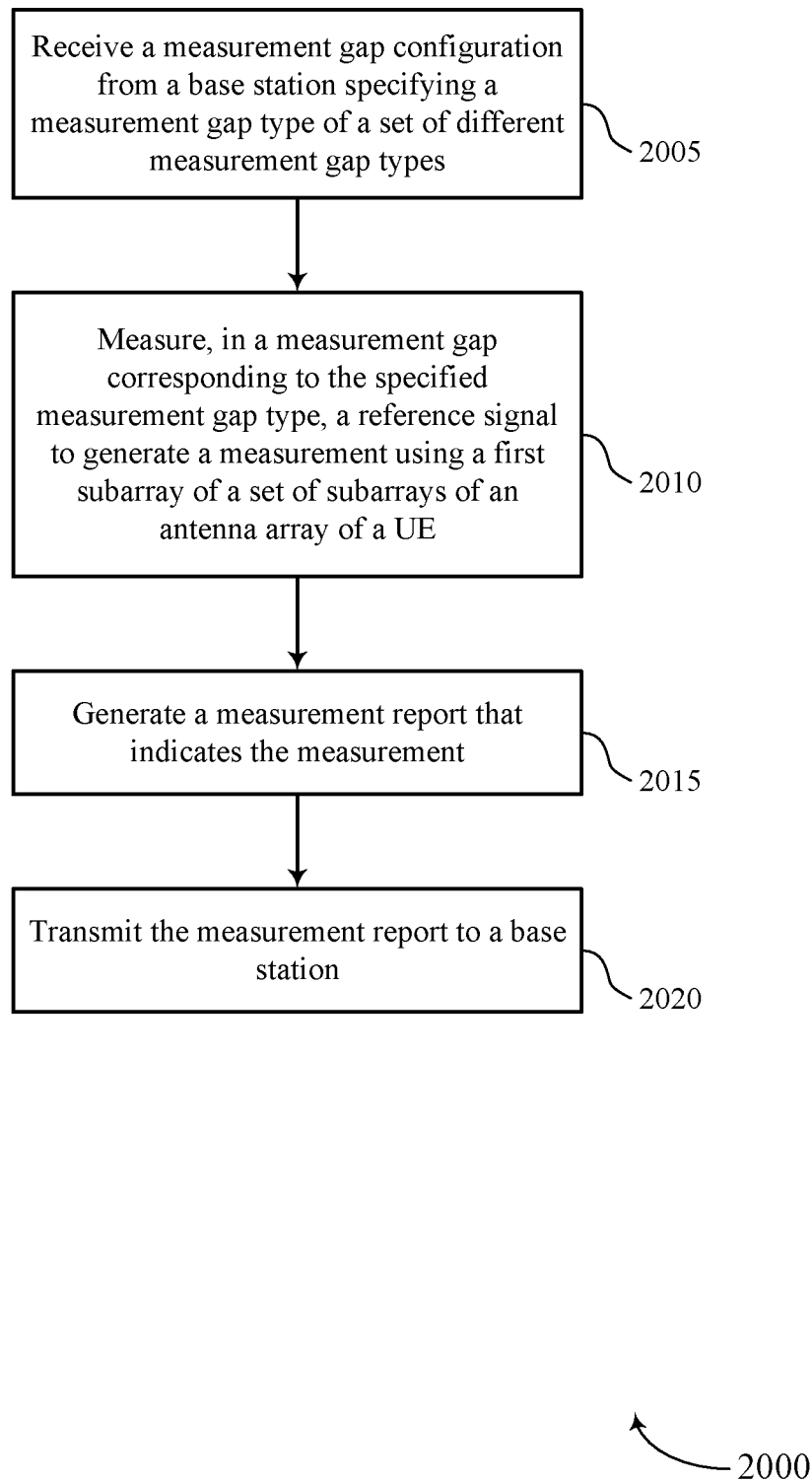

FIG. 20 shows a flowchart illustrating a method 2000 for reference signal measurement and reporting for new radio (NR) systems in accordance with aspects of the present disclosure. The operations of method 2000 may be implemented by a UE 115 or its components as described herein. For example, the operations of method 2000 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive a measurement gap configuration from a base station specifying a measurement gap type of a plurality of different measurement gap types. The operations of 2005 may be performed according to the methods described herein. In certain examples, aspects of the operations of 2005 may be performed by a UE communications manager as described with reference to FIGS. 6 through 9.

At 2010 the UE 115 may measure, in a measurement gap corresponding to the specified measurement gap type, a reference signal to generate a measurement using a first subarray of a plurality of subarrays of an antenna array of a UE. The operations of 2010 may be performed according to the methods described herein. In certain examples, aspects of the operations of 2010 may be performed by a measurement component as described with reference to FIGS. 6 through 9.

At 2015 the UE 115 may generate a measurement report that indicates the measurement. The operations of 2015 may be performed according to the methods described herein. In certain examples, aspects of the operations of 2015 may be performed by a report generation component as described with reference to FIGS. 6 through 9.

At 2020 the UE 115 may transmit the measurement report to a base station. The operations of 2020 may be performed according to the methods described herein. In certain examples, aspects of the operations of 2020 may be performed by a report generation component as described with reference to FIGS. 6 through 9.

Figure 21:
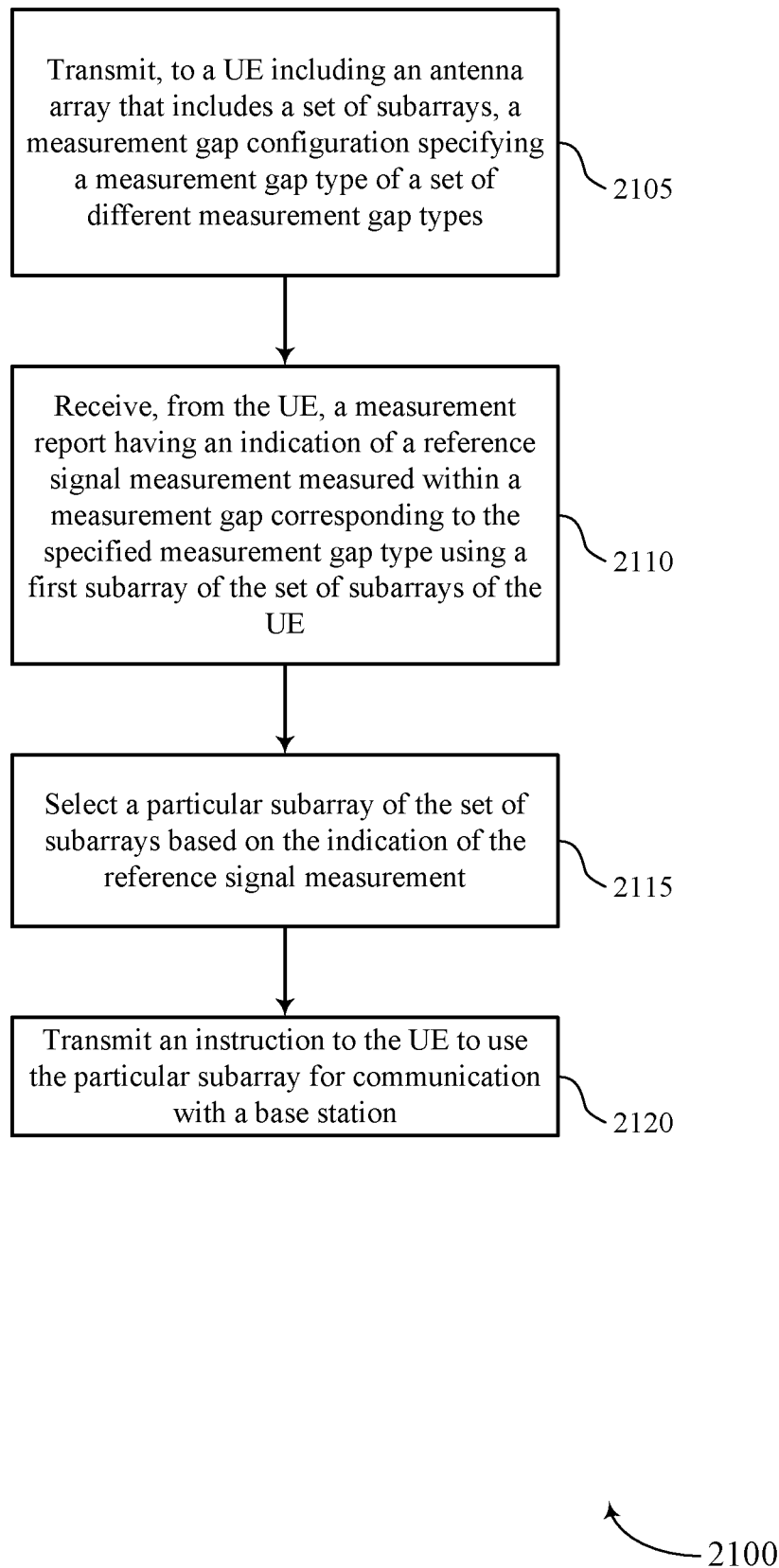

FIG. 21 shows a flowchart illustrating a method 2100 for reference signal measurement and reporting for NR systems in accordance with aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may transmit, to a UE comprising an antenna array that includes a plurality of sub arrays, a measurement gap configuration specifying a measurement gap type of a plurality of different measurement gap types. The operations of 2105 may be performed according to the methods described herein. In certain examples, aspects of the operations of 2105 may be performed by a base station communication manager as described with reference to FIGS. 10 through 13.

At 2110 the base station 105 may receive, from the UE, a measurement report having an indication of a reference signal measurement measured within a measurement gap corresponding to the specified measurement gap type using a first subarray of the plurality of subarrays of the UE. The operations of 2110 may be performed according to the methods described herein. In certain examples, aspects of the operations of 2110 may be performed by a report processing component as described with reference to FIGS. 10 through 13.

At 2115 the base station 105 may select a particular subarray of the plurality of subarrays based at least in part on the indication of the reference signal measurement. The operations of 2115 may be performed according to the methods described herein. In certain examples, aspects of the operations of 2115 may be performed by a subarray selection component as described with reference to FIGS. 10 through 13.

At 2120 the base station 105 may transmit an instruction to the UE to use the particular subarray for communication with a base station. The operations of 2120 may be performed according to the methods described herein. In certain examples, aspects of the operations of 2120 may be performed by a subarray selection component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting an indication of a radio frequency (RF) chain capability of a user equipment (UE) to a base station;
receiving a measurement gap configuration from the base station specifying a measurement gap type of a plurality of different measurement gap types based at least in part on the RF chain capability of the UE;
measuring, in a measurement gap corresponding to the specified measurement gap type, a reference signal to generate a measurement using a first subarray of a plurality of subarrays of an antenna array of the UE;
generating a measurement report specific to a rank supported by the UE and using the first subarray, wherein the measurement report indicates the measurement, the supported rank, and an index of the first subarray;
transmitting the measurement report to the base station; and
receiving an instruction from the base station indicating which subarray of the plurality of subarrays to use for communication with the base station based at least in part on the measurement report.

2. The method of claim 1, further comprising:
receiving control signaling from the base station; and
processing the control signaling to determine a plurality of time intervals over which the reference signal is transmitted.

3. The method of claim 2, further comprising:
measuring the reference signal during a first time interval of the plurality of time intervals using a second subarray of the plurality of subarrays, wherein measuring the reference signal using the first subarray occurs during a second time interval of the plurality of time intervals.

4. The method of claim 2, further comprising:
measuring a first symbol of the reference signal during a first time interval of the plurality of time intervals using a second subarray of the plurality of subarrays, wherein measuring the reference signal using the first subarray comprises: measuring a second symbol of the reference signal during the first time interval.

5. The method of claim 1, further comprising:
tuning away from a first frequency to a second frequency, wherein measuring the reference signal using the first subarray occurs while tuned to the second frequency.

6. The method of claim 1, further comprising:
tuning away from a first frequency to a second frequency;
deactivating a second subarray of the plurality of subarrays; and
activating the first subarray, wherein measuring the reference signal using the first subarray occurs while tuned to the second frequency.

7. The method of claim 1, further comprising:
determining a partition of the rank supported by the UE to be used for measuring the reference signal; and
mapping, based at least in part on the rank partition, a first radio frequency (RF) chain of the UE to the first subarray and a second RF chain of the UE to the first subarray or a second subarray of the plurality of subarrays, wherein measuring the reference signal using the first subarray occurs on the first RF chain while the second RF chain simultaneously communicates via the first subarray or the second subarray.

8. The method of claim 1, wherein measuring the reference signal using the first subarray further comprises:
determining an average of the measurement over time.

9. The method of claim 1, further comprising:
transmitting capability information of the UE to the base station, wherein the capability information indicates: whether the UE supports measurements during measurement gaps, or whether the UE supports measurements during symbol gaps, or whether the UE supports autonomous gaps, or whether partitioning of the rank supported by the UE simultaneously supports communication and measurement of the reference signal, or any combination thereof.

10. The method of claim 1, further comprising:
establishing a connection to the base station using the first subarray or a second subarray of the plurality of subarrays; and
selecting which of the plurality of subarrays to use to communicate with the base station based at least in part on the measurement.

11. The method of claim 1, wherein the measurement gap configuration instructs the UE to perform an inter-frequency measurement, or perform an intra-frequency measurement, or perform an inter-cell measurement, or perform a sweep through each of the plurality of subarrays, or select what type of measurement to make, or any combination thereof.

12. The method of claim 1, wherein the measurement gap configuration specifies a periodicity and pattern of the measurement gap.

13. The method of claim 1, wherein measuring the reference signal using the first subarray comprises:
measuring the reference signal during an autonomous gap.

14. The method of claim 1, further comprising:
measuring the reference signal using a second subarray of the plurality of subarrays to generate a second measurement, wherein the measurement report includes the second measurement.

15. A method for wireless communication by a base station, comprising:
receiving, from a user equipment (UE) comprising an antenna array that includes a plurality of subarrays, an indication of a radio frequency (RF) chain capability of the UE;
transmitting, to the UE, a measurement gap configuration specifying a measurement gap type of a plurality of different measurement gap types based at least in part on the RF chain capability of the UE;
receiving, from the UE, a measurement report having an indication of a reference signal measurement measured within a measurement gap corresponding to the specified measurement gap type using a first subarray of the plurality of subarrays of the UE, wherein the measurement report indicates a rank supported by the UE and an index of the first subarray;
selecting a particular subarray of the plurality of subarrays based at least in part on the indication of the reference signal measurement; and
transmitting an instruction to the UE to use the particular subarray for communication with the base station.

16. The method of claim 15, further comprising:
receiving capability information of the UE; and
selecting the measurement gap configuration for the UE based at least in part on the capability information.

17. The method of claim 16, wherein the capability information indicates whether the UE supports measurements during measurement gaps, or whether the UE supports measurements during symbol gaps, or whether the UE supports autonomous gaps, or whether the UE supports simultaneous communication and measurement of a reference signal, or any combination thereof.

18. The method of claim 16, further comprising:
transmitting a reference signal based at least in part on the measurement gap configuration.

19. The method of claim 18, further comprising:
transmitting the reference signal as multiple directional beams in respective time subintervals of a plurality of time intervals.

20. The method of claim 19, further comprising:
normalizing the reference signal measurement relative to a second reference signal measurement of a second subarray of the plurality of subarrays based at least in part on the rank supported by the UE.

21. An apparatus for wireless communication, in a system comprising:
a processor;
memory coupled with the processor; and
instructions stored in the memory, wherein the instructions are executable by the processor to:
transmit an indication of a radio frequency (RF) chain capability of a user equipment (UE) to a base station;
receive a measurement gap configuration from the base station specifying a measurement gap type of a plurality of different measurement gap types based at least in part on the RF chain capability of the UE;
measure, in a measurement gap corresponding to the specified measurement gap type, a reference signal to generate a measurement using a first subarray of a plurality of subarrays of an antenna array of the UE;
generate a measurement report specific to a rank supported by the UE and using the first subarray, wherein the measurement report indicates the measurement, the supported rank, and an index of the first subarray;
transmit the measurement report to the base station; and
receive an instruction from the base station indicating which subarray of the plurality of subarrays to use for communication with the base station based at least in part on the measurement report.

22. The apparatus of claim 21, wherein the instructions are further executable by the processor to:
receive control signaling from the base station; and
process the control signaling to determine a plurality of time intervals over which the reference signal is transmitted.

23. The apparatus of claim 22, wherein the instructions are further executable by the processor to:
measure the reference signal during a first time interval of the plurality of time intervals using a second subarray of the plurality of subarrays, wherein measuring the reference signal using the first subarray occurs during a second time interval of the plurality of time intervals.

24. The apparatus of claim 21, wherein the instructions are further executable by the processor to:
tune away from a first frequency to a second frequency, wherein measuring the reference signal using the first subarray occurs while tuned to the second frequency.

25. The apparatus of claim 21, wherein the instructions are further executable by the processor to:
tune away from a first frequency to a second frequency;
deactivate a second subarray of the plurality of subarrays; and
activate the first subarray, wherein measuring the reference signal using the first subarray occurs while tuned to the second frequency.

26. An apparatus for wireless communication by a base station, in a system comprising:
a processor;
memory coupled with the processor; and instructions stored in the memory, wherein the instructions are executable by the processor to:
  receive, from a user equipment (UE) comprising an antenna array that includes a plurality of subarrays, an indication of a radio frequency (RF) chain capability of the UE;
  transmit, to the UE, a measurement gap configuration specifying a measurement gap type of a plurality of different measurement gap types based at least in part on the RF chain capability of the UE;
  receive, from the UE, a measurement report having an indication of a reference signal measurement measured within a measurement gap corresponding to the specified measurement gap type using a first subarray of the plurality of subarrays of the UE, wherein the measurement report indicates a rank supported by the UE and an index of the first subarray;
  select a particular subarray of the plurality of subarrays based at least in part on the indication of the reference signal measurement; and
  transmit an instruction to the UE to use the particular subarray for communication with the base station.

27. The apparatus of claim 26, wherein the instructions are further executable by the processor to:
  receive capability information of the UE; and
  select the measurement gap configuration for the UE based at least in part on the capability information.

28. The apparatus of claim 27, wherein the capability information indicates whether the UE supports measurements during measurement gaps, or whether the UE supports measurements during symbol gaps, or whether the UE supports autonomous gaps, or whether the UE supports simultaneous communication and measurement of a reference signal, or any combination thereof.

* * * * *